US011687205B2

(12) United States Patent
Lee et al.

(10) Patent No.: US 11,687,205 B2
(45) Date of Patent: Jun. 27, 2023

(54) ELECTRONIC APPARATUS

(71) Applicant: SAMSUNG DISPLAY CO., LTD., Yongin-si (KR)

(72) Inventors: Kyungsu Lee, Suwon-si (KR); Jong-Hwa Kim, Yongin-si (KR); Jeongyun Han, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/656,697

(22) Filed: Mar. 28, 2022

(65) Prior Publication Data

US 2022/0214769 A1 Jul. 7, 2022

Related U.S. Application Data

(62) Division of application No. 17/077,640, filed on Oct. 22, 2020, now Pat. No. 11,287,938.

(30) Foreign Application Priority Data

Nov. 26, 2019 (KR) .......................... 10-2019-0153441

(51) Int. Cl.
*G06F 3/044* (2006.01)

(52) U.S. Cl.
CPC .......... *G06F 3/0446* (2019.05); *G06F 3/0443* (2019.05); *G06F 2203/04111* (2013.01)

(58) Field of Classification Search
None
See application file for complete search history.

(56) References Cited

U.S. PATENT DOCUMENTS 10,467,449 B2    11/2019  Jang et al.
2014/0098057 A1*  4/2014  Lee ...................... G06F 3/0443
                                                                345/174

(Continued)

FOREIGN PATENT DOCUMENTS

EP         3176771         6/2017
JP       2015-231444      12/2015

(Continued)

OTHER PUBLICATIONS

European Search Report dated Apr. 12, 2021 from the European Patent Office in corresponding European Patent Application 20209863.8 (7 pages).

*Primary Examiner* — Duane N Taylor, Jr.
(74) *Attorney, Agent, or Firm* — F. Chau & Associates, LLC

(57) ABSTRACT

The present disclosure relates to an electronic apparatus. The electronic apparatus includes a base substrate, a first sensing electrode, and a second sensing electrode. A hole is defined through the base substrate. The first sensing electrode includes first sensing patterns and first connection patterns, which are arranged in a first direction. The second sensing electrode includes second sensing patterns and second connection patterns, which are arranged in the first direction. One first connection pattern and one second connection pattern are spaced apart from each other in a second direction with the hole defined therebetween. A first distance in the second direction between the one first connection pattern and the one second connection pattern is greater than a second distance in the second direction between another first connection pattern and another second connection pattern.

13 Claims, 11 Drawing Sheets

(56) References Cited

U.S. PATENT DOCUMENTS

| | | |
|---|---|---|
| 2015/0355768 A1 | 12/2015 | Kuwahara et al. |
| 2017/0212615 A1 | 7/2017 | Watanabe et al. |
| 2018/0088704 A1 | 3/2018 | Schlegelmilch et al. |
| 2019/0349996 A1 | 11/2019 | Biswas et al. |
| 2020/0042123 A1 | 2/2020 | Kim et al. |
| 2020/0348783 A1* | 11/2020 | Wang .................. G06F 3/0448 |
| 2021/0004112 A1 | 1/2021 | Miyamoto |
| 2021/0157449 A1 | 5/2021 | Lee et al. |
| 2021/0157450 A1 | 5/2021 | Lee et al. |
| 2021/0278377 A1 | 9/2021 | Ogata et al. |

FOREIGN PATENT DOCUMENTS

| | | |
|---|---|---|
| KR | 10-2016-0072909 | 6/2016 |
| KR | 10-2018-0026597 | 3/2018 |
| KR | 10-2020-0015872 | 2/2020 |
| KR | 10-2021-0065246 | 6/2021 |
| WO | 2019148603 | 8/2019 |
| WO | 2019187651 | 10/2019 |

\* cited by examiner

ELECTRONIC APPARATUS

CROSS-REFERENCE TO RELATED APPLICATION

This U.S. non-provisional patent application claims priority under 35 U.S.C. § 119 of Korean Patent Application No. 10-2019-0153441, filed on Nov. 26, 2019, and to U.S. patent application Ser. No. 17/077,640 filed on Oct. 22, 2020, the contents of which are hereby incorporated by reference in their entirety.

BACKGROUND

1. Field of Disclosure

The present disclosure relates to an electronic apparatus. More particularly, the present disclosure relates to an electronic apparatus provided with a hole defined therethrough and sensing an external input.

2. Description of the Related Art

Smartphones, tablet computers, and smart watches are examples of electronic devices. These electronic devices contain various components such as input sensors and electronic modules. In some cases, these electronic component may be susceptible to damage from electrostatic discharge events.

Electrostatic discharge is a sudden flow of electricity through two electronic devices when the two electronic devices come in contact. Electrostatic discharge may follow a buildup of static charge. The buildup of static energy may then be passed through the components of an electronic device, causing damage to the device.

The damage caused by the electrostatic discharge event may render the device unusable. Therefore, there is a need in the art to reduce the possibility of an electrostatic event failure for an electronic device.

SUMMARY

The present disclosure provides an electronic apparatus with increased reliability.

Embodiments of the inventive concept provide an electronic apparatus including a base substrate comprising a first area in which a hole is defined, a second area surrounding the first area, and a third area surrounding the second area; a first sensing electrode disposed in the second area and comprising first sensing patterns and first connection patterns arranged in a first direction; and a second sensing electrode disposed in the second area, spaced apart from the first sensing electrode in a second direction crossing the first direction, and comprising second sensing patterns and second connection patterns arranged in the first direction, wherein at least one first connection pattern among the first connection patterns and at least one second connection pattern among the second connection patterns are spaced apart from each other in the second direction with the hole defined therebetween, and a first distance in the second direction between the at least one first connection pattern and the at least one second connection pattern is greater than a second distance in the second direction between another first connection pattern among the first connection patterns and another second connection pattern among the second connection patterns.

The electronic apparatus further includes a third sensing electrode disposed in the second area and including third sensing patterns and third connection patterns, which are arranged in the second direction, and a fourth sensing electrode disposed in the second area and spaced apart from the third sensing electrode in the first direction, and including fourth sensing patterns and fourth connection patterns, which are arranged in the second direction. Two third connection patterns among the third connection patterns are spaced apart from each other such that the hole is defined therebetween, and a third distance between the two third connection patterns is greater than a fourth distance between the other two third connection patterns adjacent to each other among the third connection patterns.

A fifth distance between one third connection pattern of the two third connection patterns and one third connection pattern of the other two third connection patterns adjacent to each other is smaller than the fourth distance. A third sensing pattern among the third sensing patterns connected to one third connection pattern of the two third connection patterns and one third connection pattern of the other two third connection patterns has a size smaller than a size of a third sensing pattern among the third sensing patterns connected to the other two third connection patterns.

The third sensing electrode further includes a first connection electrode surrounding the hole entirely (e.g., on each side of the hole in a plane). Two third sensing patterns among the third sensing patterns may be spaced apart from each other such that the hole is defined therebetween. And the two third sensing patterns may be electrically connected to each other by the first connection electrode.

The fourth sensing electrode further includes a second connection electrode surrounding a portion of the hole and spaced apart from the hole such that the first connection electrode is disposed therebetween. Two fourth sensing patterns among the fourth sensing patterns may be spaced apart from each other such that the hole is defined therebetween. And the two fourth sensing patterns are electrically connected to each other by the second connection electrode.

The second connection electrode has a length shorter than a length of the first connection electrode. The first connection electrode includes a same material as the third sensing patterns and is disposed on a same layer as the third sensing patterns, and the second connection electrode includes a same material as the fourth sensing patterns and is disposed on a same layer as the fourth sensing patterns.

The electronic apparatus further includes a first dummy electrode disposed between the first connection electrode and the first sensing patterns, and a second dummy electrode disposed between the second connection electrode and the first sensing patterns.

The first dummy electrode has a width equal to or greater than a width of the first connection electrode, and the second dummy electrode has a width equal to or greater than a width of the second connection electrode.

The electronic apparatus further includes a bypass pattern connected to one third sensing pattern among the third sensing patterns. Each of the third connection patterns includes an island pattern, a first bridge pattern connected to the island pattern and one third sensing pattern of the third sensing patterns, and a second bridge pattern connected to the island pattern and another third sensing pattern of the third sensing patterns, and the bypass pattern has a length shorter than a length of the first bridge pattern.

The first connection patterns are disposed on a same layer as the first sensing patterns and include a same material as the first sensing patterns, and the second connection patterns are disposed on a same layer as the second sensing patterns and includes a same material as the second sensing patterns. A width in the first direction of the hole is greater than a width in the second direction of the hole.

Embodiments of the inventive concept provide an electronic apparatus including a display panel; and an input sensor disposed on the display panel, comprising unit sensor areas arranged in a first direction and a second direction, and comprising sensing patterns and connection patterns electrically connecting the sensing patterns, wherein a hole is defined through the display panel and the input sensor, wherein the unit sensor areas comprise a first unit sensor area overlapping the hole and a second unit sensor area not overlapping the hole, wherein a first connection pattern disposed in the first unit sensor area among the connection patterns does not overlap the hole and is disposed in an area of the first unit sensor area spaced apart from a first center of the first unit sensor area, and wherein a second connection pattern disposed in the second unit sensor area among the connection patterns is disposed at a second center of the second unit sensor area. A width in the first direction of the hole is greater than a width in the second direction of the hole.

The electronic apparatus further includes a first connection electrode surrounding the hole entirely. The sensing patterns include a first sensing pattern and a second sensing pattern spaced apart from the first sensing pattern in the second direction such that the hole is disposed between the first and second sensing patterns, and the first sensing pattern and the second sensing pattern are electrically connected to each other by the first connection electrode.

The electronic apparatus further includes a second connection electrode surrounding a portion of the hole and spaced apart from the hole such that the first connection electrode is disposed between the hole and the second connection electrode. The sensing patterns further include a third sensing pattern and a fourth sensing pattern spaced apart from the third sensing pattern in the second direction such that the hole is disposed between the third sensing pattern and the fourth sensing pattern, and the third sensing pattern and the fourth sensing pattern are electrically connected to each other by the second connection electrode.

The electronic apparatus further includes a first dummy electrode disposed adjacent to the first connection electrode and a second dummy electrode disposed adjacent to the second connection electrode. The first dummy electrode has a width equal to or greater than a width of the first connection electrode, and the second dummy electrode has a width equal to or greater than a width of the second connection electrode.

The unit sensor areas further include a third unit sensor area overlapping the hole, the first center of the first unit sensor area overlaps the hole, a third center of the third unit sensor area does not overlap the hole, and a connection pattern disposed in the third unit sensor area among the connection patterns is disposed at the third center of the third unit sensor area.

The electronic apparatus further includes a bypass pattern connected to one second sensing pattern of two second sensing patterns arranged in the second direction among the sensing patterns. Each of the connection patterns includes a connection pattern connecting two first sensing patterns arranged in the first direction, an island pattern disposed between the two second sensing patterns and spaced apart from the connection pattern, a first bridge pattern connected to the island pattern and one of the two second sensing patterns, and a second bridge pattern connected to the island pattern and another of the two second sensing patterns. The bypass pattern has a length shorter than a length of the first bridge pattern.

Embodiments of the inventive concept provide an electronic apparatus comprising: a base substrate comprising a first area and a second area, wherein the first area comprises a hole through the substrate; a plurality of sensing electrodes arranged on the base substrate, wherein each of the plurality of sensing electrodes comprises one or more sensing patterns and one or more connection patterns, wherein a first subset of the connection patterns located within the first area are arranged according to a first grid pattern based on a first separation distance in a first direction and a second separation distance in a second direction, and a second subset of the connection patterns located within the second area are arranged according to a second grid pattern based on the first separation distance in the first direction and a third separation distance in the second direction, the second separation distance being greater than the third separation distance. In some examples, at least one pair of connection patterns in the first subset are aligned in the first direction, and on two opposite sides of the hole in the second direction, and no pair of connection patterns in the second subset is separated by the hole in the second direction.

According to the above, the connection patterns of the input sensor may be designed such that positions of the connection patterns do not overlap the hole. Therefore, the number of additional lines used to connect the sensing patterns is smaller than that when the connection patterns are omitted to correspond to the shape of the hole. Therefore, a size of peripheral area of the hole may be prevented from increasing. Additionally, the bypass patterns may be designed such that positions of the bypass patterns do not overlap the hole. As a result, a static electricity defect may be prevented by the bypass patterns.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
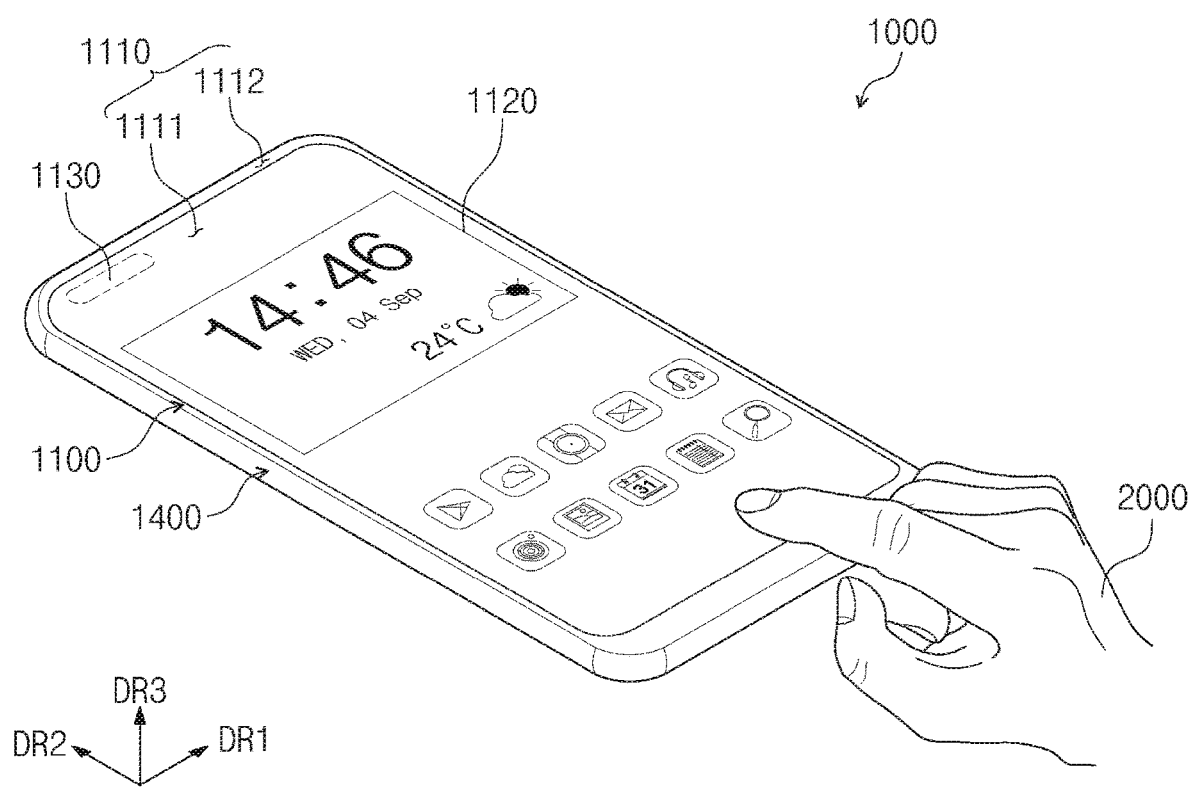
FIG. 1 is a perspective view showing an electronic apparatus according to an exemplary embodiment of the present disclosure.

The present disclosure relates to an electronic device. Certain embodiments relate to systems and method for reducing the susceptibility of an electronic device to damage from electrostatic discharge. Embodiments of the present disclosure include a device that include various electronic components, such as an input sensor that senses an external input and an electronic module. The electronic components may be electrically connected to each other using signal lines. The input sensor includes sensing electrodes used to sense the external input. The electronic module may include a camera, an infrared sensor, or a proximity sensor. The electronic module is disposed under the input sensor. In some cases, the input sensor is provided with a hole to expose the electronic module.

The position of the connection patterns of the input sensor may be designed to not overlap with the hole. Therefore, the position of the connection patterns in the region adjacent to the hole may have an irregular arrangement.

Accordingly, the number of additional wires required to connect the sensing patterns may be less than when the connection patterns are omitted corresponding to the shape of the hole when the positions of the connection patterns are adjusted. As a result, it is possible to limit the size of the peripheral area of the hole. The position of the bypass patterns can also be designed to not overlap the hole. Therefore, static electricity failure may be prevented.

In the present disclosure, it will be understood that when an element or layer is referred to as being "on", "connected to" or "coupled to" another element or layer, the element or layer can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Therefore, a first element, component, region, layer, or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as with a meaning consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

Figure 2:
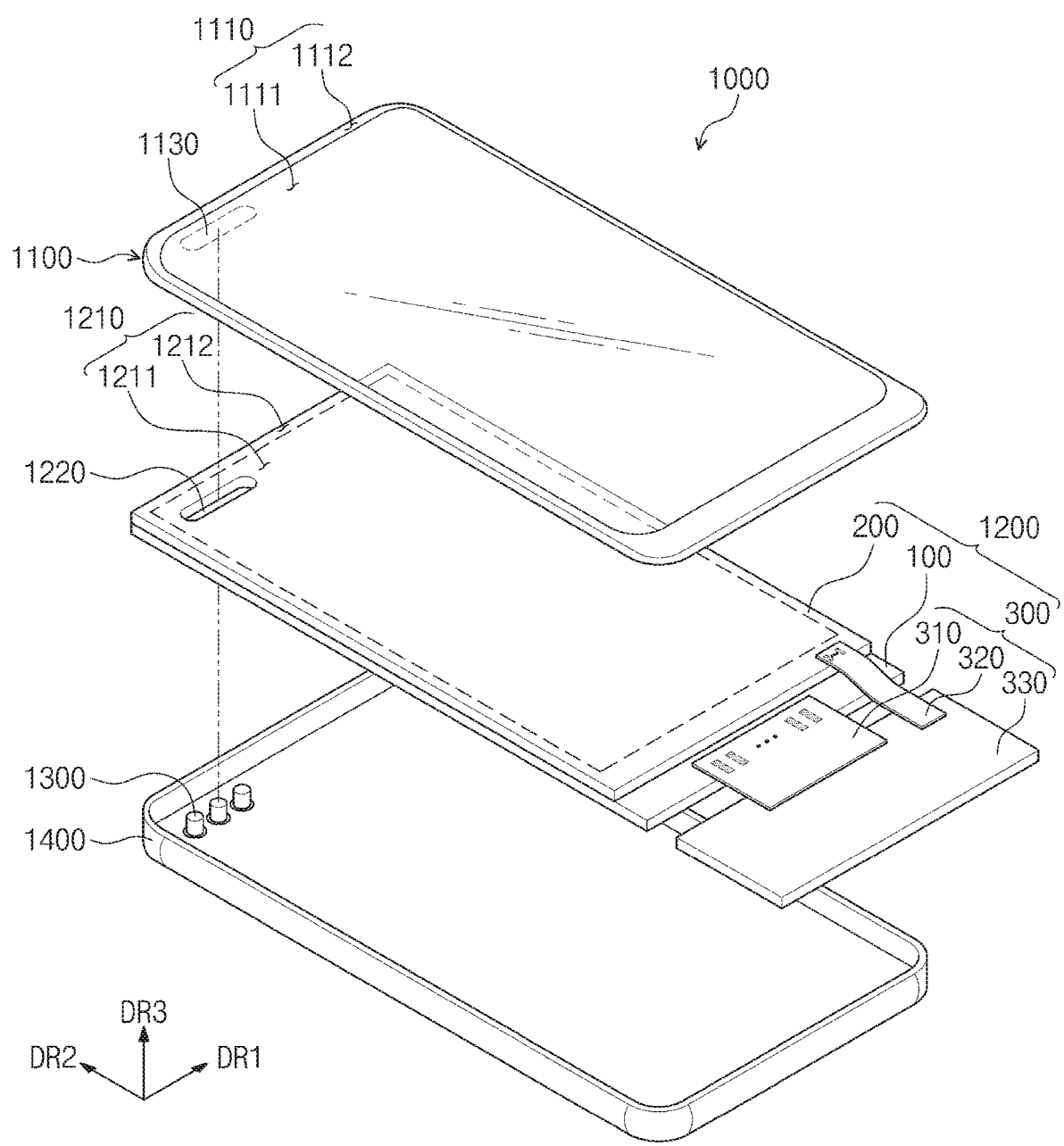
FIG. 2 is an exploded perspective view showing an electronic apparatus according to an exemplary embodiment of the present disclosure.

FIG. 1 is a perspective view showing an electronic apparatus 1000 according to an exemplary embodiment of the present disclosure. FIG. 2 is an exploded perspective view showing the electronic apparatus 1000 according to an exemplary embodiment of the present disclosure.

Referring to FIGS. 1 and 2, the electronic apparatus 1000 may be an apparatus activated in response to an electrical signal. The electronic apparatus 1000 may be applied to a large-sized electronic item, such as a television set and a monitor, and a small and medium-sized electronic item, such as a mobile phone, a tablet computer, a car navigation unit, a game unit, and a smartwatch. In the present exemplary embodiment, a smartphone will be described as a representative example of the electronic apparatus 1000.

The electronic apparatus 1000 displays an image 1120 through a display surface 1110. The display surface 1110 is substantially parallel to each of a first direction DR1 and a second direction DR2, toward a third direction DR3. The display surface 1110, through which the image 1120 is displayed, corresponds to a front surface 1110 of the electronic apparatus 1000 and a front surface 1110 of a window 1100. Hereinafter, the display surface and the front surface of the electronic apparatus 1000 and the front surface of the window 1100 are assigned with the same reference numerals as each other.

In the present exemplary embodiment, front (or upper) and rear (or lower) surfaces of each member are defined with respect to a direction in which the image 1120 is displayed. The front and rear surfaces face each other in the third direction DR3, and a normal line direction of each of the front and rear surfaces is substantially parallel to the third direction DR3.

The electronic apparatus 1000 includes the window 1100, a display module 1200, electronic modules 1300, and a housing 1400. In the present exemplary embodiment, the window 1100 and the housing 1400 are coupled to each other to provide an appearance of the electronic apparatus 1000.

The window 1100 includes an optically transparent insulating material. For example, the window 1100 includes a glass or plastic material. The window 1100 has a single-layer or multi-layer structure. As an example, the window 1100 includes a plurality of plastic films attached to each other by an adhesive or a glass substrate and a plastic film attached to the glass substrate by an adhesive.

The window 1100 is divided into a transmissive area 1111 and a bezel area 1112 in a plan view. In the following descriptions, the expression "in a plan view" may mean a state of being viewed in the third direction DR3. Additionally or alternatively, the expression "thickness direction" may mean the third direction DR3.

The transmissive area 1111 is optically transparent. For example, the bezel area 1112 has a relatively lower transmittance compared to the transmissive area 1111. The bezel area 1112 defines a shape of the transmissive area 1111. The bezel area 1112 is disposed adjacent to the transmissive area 1111 and surrounds the transmissive area 1111.

The bezel area 1112 has a predetermined color. The bezel area 1112 covers a peripheral area 1212 of the display module 1200 to prevent the peripheral area 1212 from being viewed from the outside. However, this is merely exemplary, and the bezel area 1112 may be omitted from the window 1100 according to the exemplary embodiment of the present disclosure.

In the exemplary embodiment of the present disclosure, a sensor area 1130 overlaps the electronic modules 1300 described later. According to the present disclosure, the sensor area 1130 is defined to overlap the transmissive area 1111. Accordingly, a separate area provided to define the sensor area 1130 in the separate area rather than the transmissive area 1111. Therefore, a size of the bezel area 1112 is reduced.

FIG. 2 shows one sensor area 1130 as a representative example. However, the present disclosure should not be limited thereto or thereby. For example, the sensor area 1130 is defined in two or more. Additionally or alternatively, FIG. 2 shows the sensor area 1130 defined at an upper left side of the transmissive area 1111 as a representative example. However, the sensor area 1130 may be defined at an upper right side of the transmissive area 1111, at an upper center of the transmissive area 1111, at a lower left side of the transmissive area 1111, or at a lower right side of the transmissive area 1111.

The display module 1200 is disposed under the window 1100. In the present disclosure, the term "below" may mean a direction opposite to a direction in which the display module 1200 displays the image 1120. The display module 1200 displays the image 1120 and senses the external input. The display module 1200 includes a front surface 1210 in which an active area 1211 and the peripheral area 1212 are defined. The active area 1211 is activated in response to an electrical signal.

In the present exemplary embodiment, the active area 1211 is an area through which the image 1120 is displayed and the external input 2000 is sensed. The transmissive area 1111 overlaps at least the active area 1211. For example, the transmissive area 1111 overlaps an entire surface or at least a portion of the active area 1211. Accordingly, a user perceives the image 1120 or provides the external input 2000 through the transmissive area 1111.

The peripheral area 1212 is covered by the bezel area 1112. The peripheral area 1212 is disposed adjacent to the active area 1211. The peripheral area 1212 surrounds the active area 1211. A driving circuit or a driving line is disposed in the peripheral area 1212 to drive the active area 1211.

The display module 1200 includes a display panel 100, an input sensor 200, and a driving circuit 300.

The display panel 100 includes configurations appropriate to generate the image 1120. The image 1120 generated by the display panel 100 is displayed through the display surface 1210 and perceived by the user through the transmissive area 1111.

The input sensor 200 senses the external input 2000 applied from the outside. For example, the input sensor 200 senses the external input 2000 applied to the window 1100. The external input 2000 is a user's input. The user's input may include a variety of external inputs, such as a part of user's body, light, heat, pen, or pressure. In the present exemplary embodiment, the external input 2000 is shown by a user's hand touching the front surface 1110. However, this is merely exemplary. As described above, the external input 2000 may be provided in various forms. Additionally or alternatively, the external input 2000 applied to a side surface or a rear surface of the electronic apparatus 1000 depending on the structure of the electronic apparatus 1000 may be sensed. However, the external input 2000 should not be particularly limited.

The driving circuit 300 is electrically connected to the display panel 100 and the input sensor 200. The driving circuit 300 includes a first flexible film 310, a second flexible film 320, and a main circuit board 330.

The first flexible film 310 is electrically connected to the display panel 100. The first flexible film 310 connects the display panel 100 and the main circuit board 330. The first flexible film 310 is connected to pads (display pads) of the display panel 100. The pads are disposed in the peripheral area 1212. The first flexible film 310 provides electrical signals to the display panel 100 to drive the display panel 100. The electrical signals are generated by the first flexible film 310 or the main circuit board 330.

The second flexible film 320 is electrically connected to the input sensor 200. The second flexible film 320 connects the input sensor 200 and the main circuit board 330. The second flexible film 320 is connected to pads (sensing pads) of the input sensor 200, which are disposed in the peripheral area 1212. The second flexible film 320 provides electrical signals to the input sensor 200 to drive the input sensor 200. The electrical signals are generated by the second flexible film 320 or the main circuit board 330.

The main circuit board 330 includes various driving circuits to drive the display panel 100 and the input sensor 200 or a connector to provide power. The first and second flexible films 310 and 320 are connected to the main circuit board 330. According to the present disclosure, the display panel 100 and the input sensor 200 are controlled by using one main circuit board 330. However, this is merely exemplary. In the display module 1200, according to an exemplary embodiment of the present disclosure, the display panel 100 and the input sensor 200 may be connected to different main circuit boards. One of the first and second flexible films 310 and 320 may not be connected to the main circuit board 330. However, the display panel 100 and the input sensor 200 should not be limited to a particular embodiment.

In the exemplary embodiment of the present disclosure, a predetermined hole 1220 (hereinafter, referred to as a "hole") is defined in an area of the display module 1200, which corresponds to the sensor area 1130. The hole 1220 is defined in the active area 1211 and penetrates through the display module 1200. Some areas of the display panel 100 and the input sensor 200 are penetrated by the hole 1220. For example, the hole 1220 is defined by removing all or at least a portion of components, wherein the components are disposed to overlap the sensor area 1130, of the display panel 100 and the input sensor 200. As the hole 1220 is defined in the active area 1211, a size of the peripheral area 1212 is reduced.

When viewed in a plan view, the electronic modules 1300 overlaps the hole 1220 and the sensor area 1130. The electronic modules 1300 is disposed under the display module 1200, and at least a portion of each of the electronic modules 1300 is accommodated in the hole 1220. The electronic modules 1300 receive the external input applied thereto through the sensor area 1130 or provide outputs through the sensor area 1130.

In the exemplary embodiment of the present disclosure, three electronic modules 1300 are shown. However, the number of the electronic modules 1300 should not be limited to three. The electronic modules 1300 may be a camera module. However, the electronic modules 1300 should not be limited thereto or thereby. The electronic modules 1300 may include a light-emitting module, a light-receiving module, or a thermal-sensing module.

The housing 1400 is coupled to the window 1100. The housing 1400 is coupled to the window 1100 to provide an inner space. The display module 1200 and the electronic modules 1300 are accommodated in the inner space.

The housing 1400 has a material with relatively high rigidity. For example, the housing 1400 includes glass, plastic, or metal material or a plurality of frames and/or plates of combinations thereof. The housing 1400 stably protects the components of the electronic apparatus 1000 accommodated in the inner space from external impacts.

Figure 3:
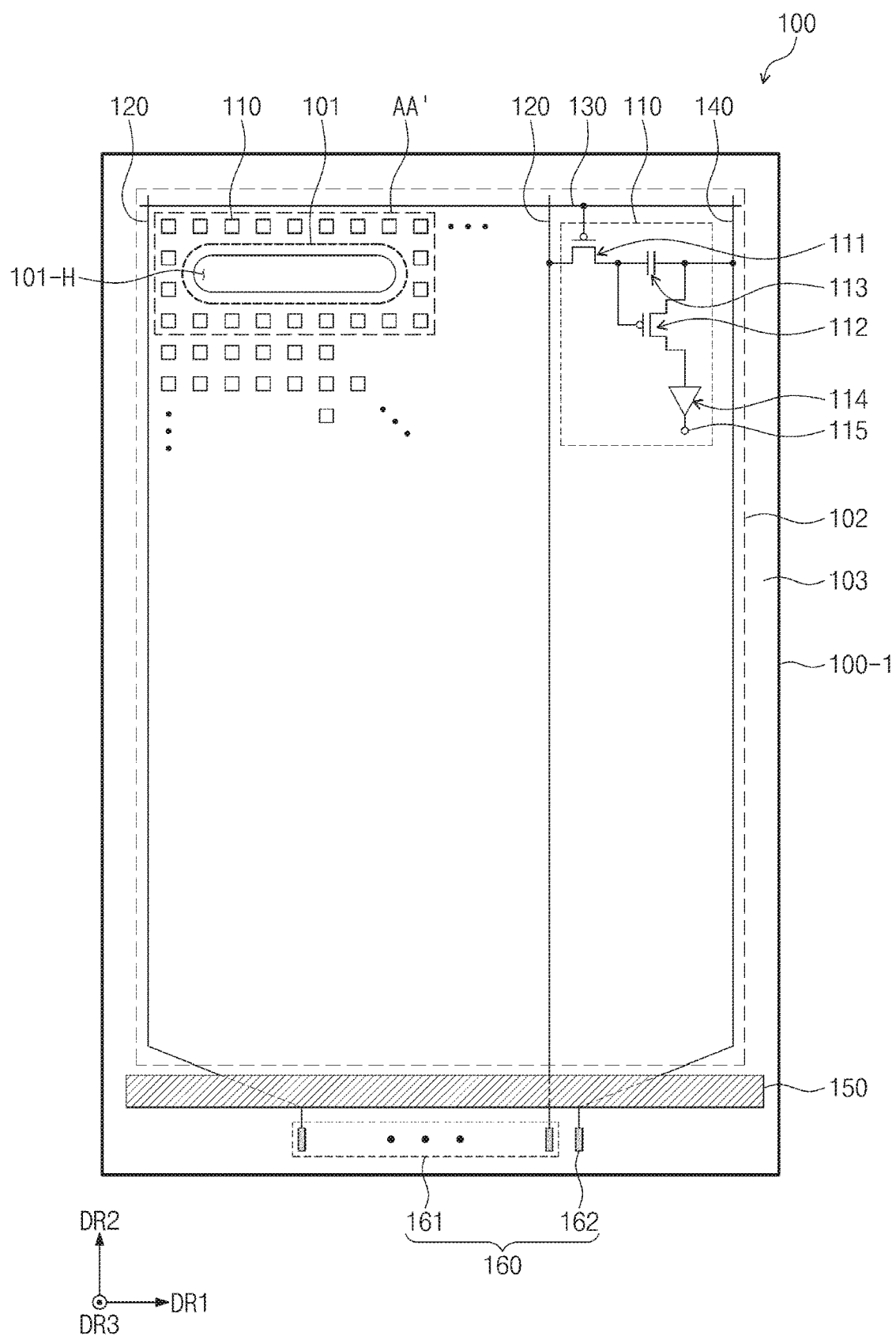
FIG. 3 is a plan view showing a display panel according to an exemplary embodiment of the present disclosure.
Figure 4:
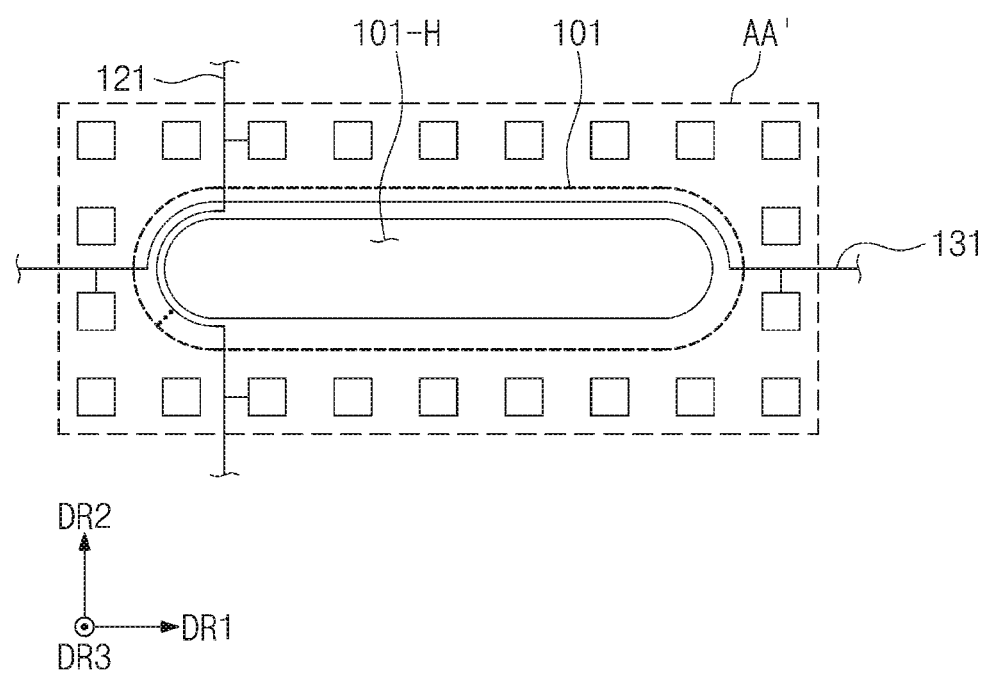
FIG. 4 is an enlarged view showing a portion AA' of FIG. 3.

FIG. 3 is a plan view showing the display panel 100 according to an exemplary embodiment of the present disclosure. FIG. 4 is an enlarged view showing a portion AA' of FIG. 3.

Referring to FIGS. 3 and 4, the display panel 100 includes a base substrate 100-1, a plurality of pixels 110, a plurality of signal lines 120, 130, and 140, a power pattern 150, and a plurality of display pads 160.

The base substrate 100-1 includes an insulating substrate. For example, the base substrate 100-1 includes a glass substrate, a plastic substrate, or a combination thereof.

The base substrate 100-1 may be referred to as a "display base substrate".

The base substrate 100-1 includes a first area 101, a second area 102, and a third area 103, which are defined therein. A hole 101-H is defined in the first area 101, and the first area 101 surrounds the hole 101-H. The second area 102 surrounds the first area 101. The third area 103 surrounds the second area 102. The first area 101 overlaps the sensor area 1130 (refer to FIG. 1). The second area 102 is included in the active area 1211 (refer to FIG. 2). The third area 103 is included in the peripheral area 1212 (refer to FIG. 2).

The signal lines 120, 130, and 140 are electrically connected to the pixels 110 to transmit the electrical signals to the pixels 110. In FIG. 3, the signal lines 120, 130, and 140 including a data line 120, a scan line 130, and a power line 140 are shown as a representative example. However, these are merely exemplary. The signal lines 120, 130, and 140 may further include one of an initialization voltage line and a light-emitting control line and should not be limited to a particular embodiment.

The pixels 110 are disposed on the second area 102. In the present exemplary embodiment, an equivalent circuit diagram of one pixel 110 is shown as a representative example. The pixel 110 includes a first thin film transistor 111, a second thin film transistor 112, a capacitor 113, and a light-emitting device 114. The first thin film transistor 111 is a switching device that controls an on-off of the pixel 110. The first thin film transistor 111 transmits or blocks a data signal applied thereto through the data line 120 in response to a scan signal applied thereto through the scan line 130.

The capacitor 113 is connected to the power line 140 and the first thin film transistor 111. The capacitor 113 is charged with an electric charge by an amount corresponding to a difference between the data signal transmitted from the first thin film transistor 111 and a first power signal applied to the power line 140.

The second thin film transistor 112 is connected to the first thin film transistor 111, the capacitor 113, and the light-emitting device 114. The second thin film transistor 112 controls a driving current flowing through the light-emitting device 114 in response to the amount of the electric charge charged in the capacitor 113. A turn-on time of the second thin film transistor 112 is determined in accordance with the amount of the electric charge charged in the capacitor 113. The second thin film transistor 112 provides the first power signal applied thereto through the power line 140 to the light-emitting device 114.

The light-emitting device 114 generates light or controls an amount of the light in response to electrical signals. For example, the light-emitting device 114 includes an organic light-emitting device or a quantum dot light-emitting device.

The light-emitting device 114 is connected to a power terminal 115 and receives a power signal (hereinafter, referred to as a "second power signal") different from the first power signal provided through the power line 140. The driving current corresponding to a difference between an electrical signal provided from the second thin film transistor 112 and the second power signal flows through the light-emitting device 114, and the light-emitting device 114 generates the light corresponding to the driving current. Meanwhile, this is merely exemplary, and the pixel 110 may include electronic elements with various configurations and arrangements. However, the pixel 110 should not be particularly limited.

As described above, the hole 101-H is surrounded by the active area 1211 (refer to FIG. 2). Accordingly, at least some of the pixels 110 are arranged adjacent to the hole 101-H.

Some pixels 110 of the pixels 110 surround the hole 101-H.

A plurality of signal lines 121 and 131 electrically connected to the pixels 110 is disposed in the first area 101. The signal lines 121 and 131 are connected to the pixels 110 via the first area 101. For the convenience of explanation, FIG. 4 shows a first signal line 121 and a second signal line 131 among the signal lines connected to the pixels 110 as a representative example.

The first signal line 121 extends in the second direction DR2. The first signal line 121 is connected to the pixels 110 arranged in the same column in the second direction DR2 among the pixels 110. The first signal line 121 is described as corresponding to the data line 120.

Some or all of the pixels 110 connected to the first signal line 121 are disposed at an upper side with respect to the hole 101-H. The others of the pixels 110 are disposed at a lower side with respect to the hole 101-H. Accordingly, the pixels 110 arranged in the same column and connected to the first signal line 121 receive the data signal through the same line even though some pixels 110 are removed by forming the hole 101-H.

The second signal line 131 extends in the first direction DR1. The second signal line 131 is connected to the pixels 110 arranged in the same row in the first direction DR1 among the pixels 110. The second signal line 131 is described as corresponding to the scan line 130.

Some pixels of the pixels 110 connected to the second signal line 131 are disposed at a left side with respect to the hole 101-H, and the others are disposed at a right side with respect to the hole 101-H. Accordingly, the pixels 110 arranged in the same row and connected to the second signal line 131 are turned on and off by substantially the same gate signal even though some pixels 110 are removed by forming the hole 101-H.

Referring to FIG. 3 again, the power pattern 150 is disposed in the third area 103. The power pattern 150 is electrically connected to the power lines 140. The display panel 100 includes the power pattern 150. Therefore, the display panel 100 provides the first power signal with substantially the same level to the pixels 110.

The display pads 160 include a first pad 161 and a second pad 162. The first pad 161 is provided in plural, and the first pads 161 are respectively connected to the data lines 120. The second pad 162 is connected to the power pattern 150 and electrically connected to the power line 140.

The display panel 100 provides electrical signals applied thereto through the display pads 160 from the outside to the pixels 110. Meanwhile, the display pads 160 further include pads to receive other electrical signals in addition to the first pad 161 and the second pad 162. However, the display pads 160 should not be particularly limited.

Figure 5:
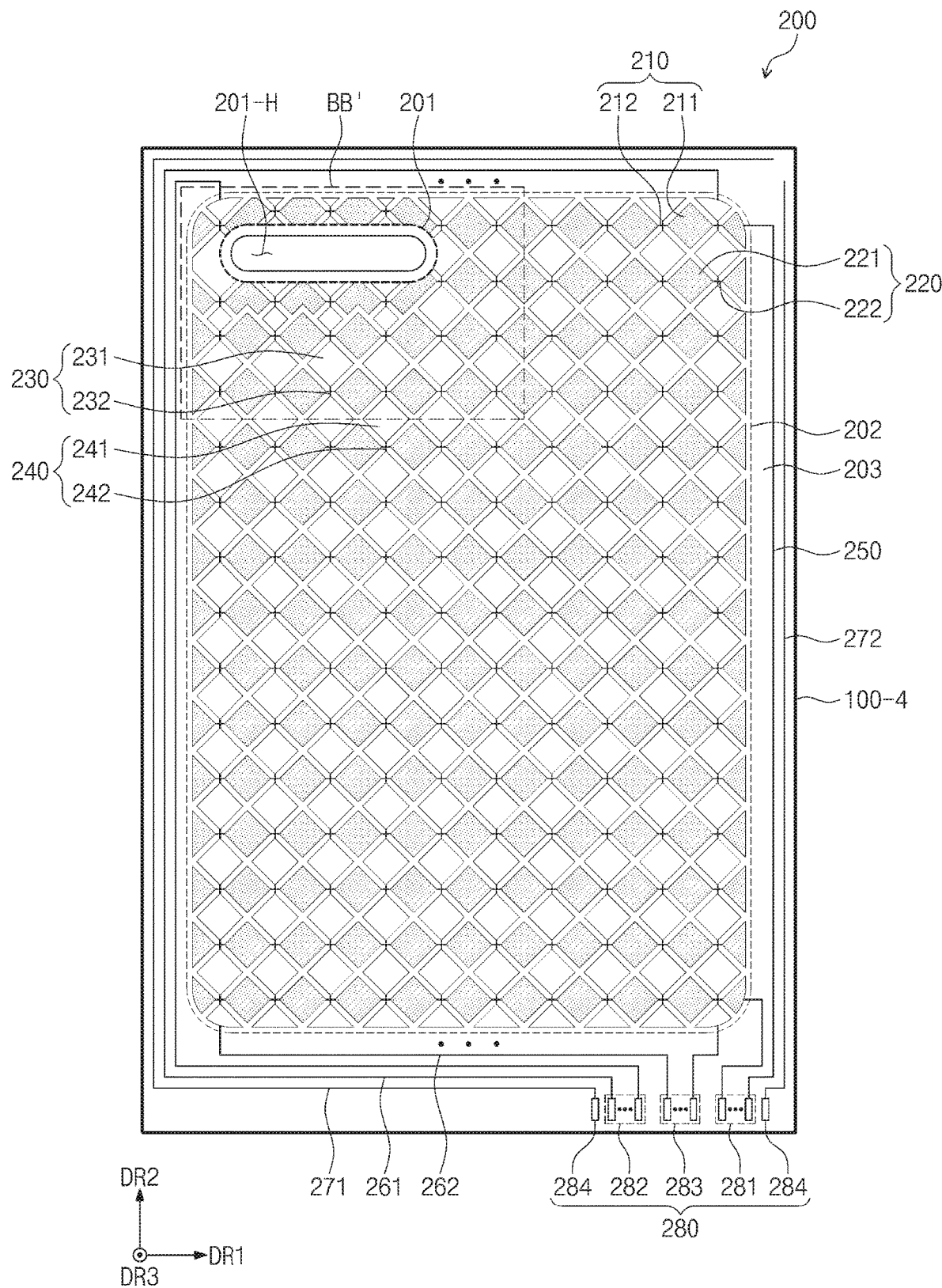
FIG. 5 is a plan view showing an input sensor according to an exemplary embodiment of the present disclosure.
Figure 6:
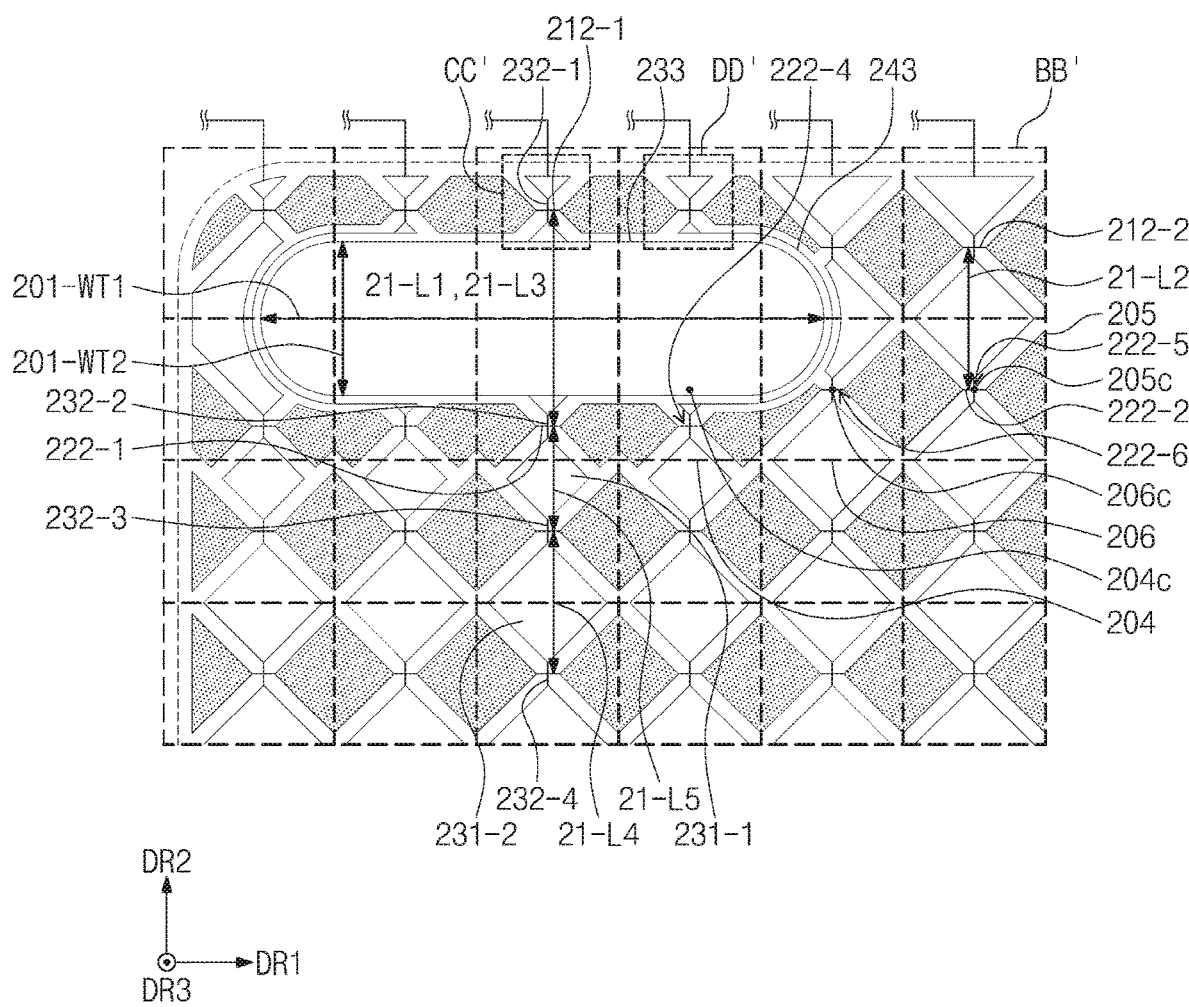
FIG. 6 is an enlarged plan view showing a portion BB' shown in FIG. 5.

FIG. 5 is a plan view showing an input sensor 200 according to an exemplary embodiment of the present disclosure. FIG. 6 is an enlarged plan view showing a portion BB' shown in FIG. 5.

Referring to FIGS. 5 and 6, the input sensor 200 includes a base substrate 100-4, receiving electrodes 210 and 220, transmitting electrodes 230 and 240, first sensing lines 250, second sensing lines 261 and 262, ground lines 271 and 272, and sensing pads 280.

The base substrate 100-4 includes an insulating substrate. For example, the base substrate 100-4 includes a glass substrate, a plastic substrate, or a combination thereof.

The base substrate 100-4 includes a first area 201, a second area 202, and a third area 203, which are defined therein. A hole 201-H is defined in the first area 201, and the first area 201 surrounds the hole 201-H. The second area 202 surrounds the first area 201. The third area 203 surrounds the second area 202. At least a portion of the first area 201 overlaps the sensor area 1130 (refer to FIG. 1). The second area 202 is included in the active area 1211 (refer to FIG. 2). The third area 203 is included in the peripheral area 1212 (refer to FIG. 2).

The hole 201-H overlaps the hole 101-H, and the holes 101-H and 201-H form the hole 1220 (refer to FIG. 2). A first width 201-WT1 in the first direction DR1 of the hole 201-H is greater than a second width 201-WT2 in the second direction DR2 of the hole 201-H. Each of the first width 201-WT1 and the second width 201-WT2 is a maximum width in a corresponding direction thereof. The hole 201-H may be referred to as a "wide hole".

The receiving electrodes 210 and 220 and the transmitting electrodes 230 and 240 are disposed in the second area 202. The input sensor 200 obtains information about the external input 2000 (refer to FIG. 1) based on a variation in capacitance between the receiving electrodes 210 and 220 and the transmitting electrodes 230 and 240.

The receiving electrodes 210 and 220 extend in the first direction DR1 and are arranged in the second direction DR2. The transmitting electrodes 230 and 240 extend in the second direction DR2 and are arranged in the first direction DR1.

A transmission signal is applied to the transmitting electrodes 230 and 240. The variation in capacitance between the receiving electrodes 210 and 220, and the transmitting electrodes 230 and 240 is sensed through the receiving electrodes 210 and 220. In the exemplary embodiment of the present disclosure, the transmitting electrodes 230 and 240 may be changed to the receiving electrodes 210 and 220, and vice versa.

The receiving electrodes 210 and 220 include a first sensing electrode 210 and a second sensing electrode 220. The transmitting electrodes 230 and 240 include a third sensing electrode 230 and a fourth sensing electrode 240.

The first sensing electrode 210 includes first sensing patterns 211 and first connection patterns 212. The first sensing patterns 211 and the first connection patterns 212 are arranged in the first direction DR1.

The second sensing electrode 220 is spaced apart from the first sensing electrode 210 in the second direction DR2. The second sensing electrode 220 includes second sensing patterns 221 and second connection patterns 222. The second sensing patterns 221 and the second connection patterns 222 are arranged in the first direction DR1.

The third sensing electrode 230 includes third sensing patterns 231 and third connection patterns 232. The third sensing patterns 231 and the third connection patterns 232 are arranged in the second direction DR2.

The fourth sensing electrode 240 is spaced apart from the third sensing electrode 230 in the first direction DR1. The fourth sensing electrode 240 includes fourth sensing patterns 241 and fourth connection patterns 242. The fourth sensing patterns 241 and the fourth connection patterns 242 are arranged in the second direction DR2.

The first sensing electrode 210 and the second sensing electrode 220 are disposed adjacent to the hole 201-H. A portion of the first sensing electrode 210 and a portion of the second sensing electrode 220 are spaced apart from each other with the hole 201-H defined therebetween.

At least one first connection pattern 212-1 of the first connection patterns 212 and at least one second connection pattern 222-1 of the second connection patterns 222 are spaced apart from each other with the hole 201-H defined therebetween. A first distance 21-L1 between the first connection pattern 212-1 and the second connection pattern 222-1 is greater than the second width 201-WT2 of the hole 201-H.

A second distance 21-L2 between the other first connection pattern 212-2 of the first connection patterns 212 and the other second connection pattern 222-2 of the second connection patterns 222 is smaller than the first distance 21-L1. The hole 201-H may not be defined between the first connection pattern 212-2 and the second connection pattern 222-2.

An imaginary line that penetrates through the first connection pattern 212-1 and extends in the first direction DR1 does not overlap the first connection pattern 212-2. Additionally or alternatively, an imaginary line that penetrates through the second connection pattern 222-1 and extends in the first direction DR1 does not overlap the second connection pattern 222-2. The imaginary lines may be straight lines.

At least two third connection patterns 232-1 and 232-2 among the third connection patterns 232 are spaced apart from each other with the hole 201-H defined therebetween. The hole 201-H may not be defined between other two third connection patterns 232-3 and 232-4 adjacent to each other among the third connection patterns 232.

A third distance 21-L3 between the two third connection patterns 232-1 and 232-2 is greater than a fourth distance 21-L4 between the other two third connection patterns 232-3 and 232-4 adjacent to each other.

A fifth distance 21-L5 between one third connection pattern 232-2 of the two third connection patterns 232-1 and 232-2 and one third connection pattern 232-3 of the other two third connection patterns 232-3 and 232-4 adjacent to each other is smaller than the fourth distance 21-L4.

Among the third sensing patterns 231, a size of the third sensing pattern 231-1 connected to the one third connection pattern 232-2 of the two third connection patterns 232-1 and 232-2 and the one third connection pattern 232-3 of the other two third connection patterns 232-3 and 232-4 adjacent to each other is smaller than a size of the third sensing pattern 231-2 connected to the other two third connection patterns 232-3 and 232-4 adjacent to each other among the third sensing patterns 231.

According to the exemplary embodiment of the present disclosure, positions of some connection patterns among the connection patterns may be adjusted corresponding to the shape and position of the hole 201-H. For example, when assuming that the connection patterns and the sensing patterns are regularly arranged, overlapping connection patterns that overlap the hole 201-H are defined. According to the exemplary embodiment, positions of the overlapping connection patterns may be changed and designed so that the overlapping connection patterns do not overlap the hole 201-H. For example, the overlapping connection patterns may be disposed in the second area 202. Therefore, the connection patterns and the sensing patterns may be irregularly arranged in some areas. For example, some connection patterns may be irregularly arranged in an area adjacent to the hole 201-H.

According to the exemplary embodiment of the present disclosure, since the positions of the first connection patterns 212-1 and the second connection patterns 222-1 are adjusted, all the first connection patterns 212-1 and the first sensing patterns 211 are electrically connected, and all the second connection patterns 222-1 and the second sensing patterns 221 are electrically connected. Additionally or alternatively, additional lines to electrically connect the first sensing patterns 211 and to electrically connect the second sensing patterns 221 are not required. Therefore, an increase in the size of the first area 201 may be prevented. The first area 201 corresponds to the peripheral area of the hole 201-H but is not the active area.

Unit sensor areas 204, 205, and 206 are defined in the input sensor 200 and arranged in the first direction DR1 and the second direction DR2. Portions of each of the four sensing patterns and two connection patterns are disposed in each of the unit sensor areas 204, 205, and 206. The four sensing patterns and two connection patterns may be insulated from each other while crossing each other.

The unit sensor areas 204, 205, and 206 include a first unit sensor area 204, a second unit sensor area 205, and a third unit sensor area 206. Each of the first, second, and third unit sensor areas 204, 205, and 206 may have a quadrangular shape. Additionally or alternatively, first, second, and third centers 204c, 205c, and 206c are respectively defined in the first, second, and third unit sensor areas 204, 205, and 206.

Some areas of the first unit sensor area 204 overlap the hole 201-H, and the first center 204c of the first unit sensor area 204 overlaps the hole 201-H. The second unit sensor area 205 and the second center 205c of the second unit sensor area 205 do not overlap the hole 201-H. Some areas of the third unit sensor area 206 overlap the hole 201-H, and the third center 206c of the third unit sensor area 206 does not overlap the hole 201-H.

Connection patterns 222-4 disposed in the first unit sensor area 204 do not overlap the first center 204c. The connection patterns 222-4 are spaced apart from the first center 204c. Connection patterns 222-5 disposed in the second unit sensor area 205 overlap the second center 205c, and connection patterns 222-6 disposed in the third unit sensor area 206 overlap the third center 206c.

When the connection patterns are all arranged regularly at the centers of the unit sensor areas, the connection patterns disposed at the areas overlapping the hole 201-H may be omitted. However, according to the exemplary embodiment of the present disclosure, when the center of the unit sensor area overlaps the hole 201-H, the connection pattern may be designed to be disposed in an area spaced from the center. Accordingly, the connection pattern may be retained in the area surrounding the hole 201-H.

According to an exemplary embodiment of the present disclosure, the third sensing electrode 230 further includes a first connection electrode 233. The first connection electrode 233 surrounds the hole 201-H entirely. For example, the first connection electrode 233 form a closed curve shape in a plane. The two third sensing patterns 231 are spaced apart from each other with the hole 201-H defined therebetween. The two third sensing patterns 231 are electrically connected to the first connection electrode 233.

According to an exemplary embodiment of the present disclosure, the two third sensing patterns 231 have the same effect as being connected through two lines. Therefore, although a portion of a left side of the first connection electrode 233 is unintentionally disconnected, the two third sensing patterns 231 are electrically connected to each other through a portion of a right side of the first connection electrode 233.

According to an exemplary embodiment of the present disclosure, the fourth sensing electrode 240 further includes a second connection electrode 243. The second connection electrode 243 surrounds a portion of the hole 201-H. The second connection electrode 243 is spaced apart from the hole 201-H such that the first connection electrode 233 is disposed between the second connection electrode 243 and the hole 201-H.

According to an exemplary embodiment of the present disclosure, the third sensing electrode 230 is disposed to be more adjacent to a center area of the hole 201-H than the fourth sensing electrode 240 is. The first connection electrode 233 has a length longer than a length of the second connection electrode 243. Additionally or alternatively, the length of the first connection electrode 233 is two times longer than the length of the second connection electrode 243. Since the length of the second connection electrode 243 is relatively shorter than the length of the first connection electrode 233, the probability that the second connection electrode 243 is disconnected is lower than that of the first connection electrode 233.

The first sensing lines 250 and the second sensing lines 261 and 262 are disposed in the third area 203. The first sensing lines 250 are electrically connected to the receiving electrodes 210 and 220. The second sensing lines 261 are electrically connected to one or more ends of the transmitting electrodes 230 and 240, respectively. The second sensing lines 262 are electrically connected to the other ends of the transmitting electrodes 230 and 240, respectively.

The transmitting electrodes 230 and 240 have a relatively longer length than the receiving electrodes 210 and 220. Accordingly, two second sensing lines 261 and 262 are electrically connected to the transmitting electrodes 230 and 240, respectively. Therefore, the sensitivity of the transmitting electrodes 230 and 240 is uniformly maintained. However, this is merely exemplary. For example, some of the second sensing lines 261 and 262, e.g., the second sensing lines 262, may be omitted.

Ground lines 271 and 272 are disposed in the third area 203. The ground lines 271 and 272 receive a ground voltage. For example, electric charges are discharged through the ground lines 271 and 272. Therefore, a device destruction due to electrostatic discharge may be prevented.

The sensing pads 280 are disposed in the third area 203. The sensing pads 280 include first sensing pads 281, second sensing pads 282, third sensing pads 283, and fourth sensing pads 284. The first sensing pads 281 are respectively connected to the first sensing lines 250. The second sensing pads 282 are respectively connected to the second sensing lines 261. The third sensing pads 283 are respectively connected to the second sensing lines 262. The fourth sensing pads 284 are respectively connected to the ground lines 271 and 272.

Accordingly, embodiments of the inventive concept provide an electronic apparatus comprising: a base substrate (e.g., base substrate 100-1) comprising a first area and a second area, wherein the first area comprises a hole (e.g., the hole 101-H) through the base substrate; a plurality of sensing electrodes (e.g., first sensing electrode 210 and second sensing electrode 220) arranged on the base substrate, wherein each of the plurality of sensing electrodes comprises one or more sensing patterns (e.g., first sensing patterns 211 or second sensing patterns 221) and one or more connection patterns (e.g., first connection pattern 212 or second connection pattern 222), wherein a first subset of the connection patterns located within the first area is arranged according to a first grid pattern based on a first separation distance in a first direction and a second separation distance in a second direction (e.g., first distance 21-L1), and a second subset of the connection patterns located within the second area is arranged according to a second grid pattern based on the first separation distance in the first direction and a third separation distance in the second direction (e.g., second distance 21-L2), the second separation distance being greater than the third separation distance. In some examples, at least one pair of connection patterns in the first subset are aligned in the first direction, and on two opposite sides of the hole in the second direction, and no pair of connection patterns in the second subset is separated by the hole in the second direction.

Figure 7:
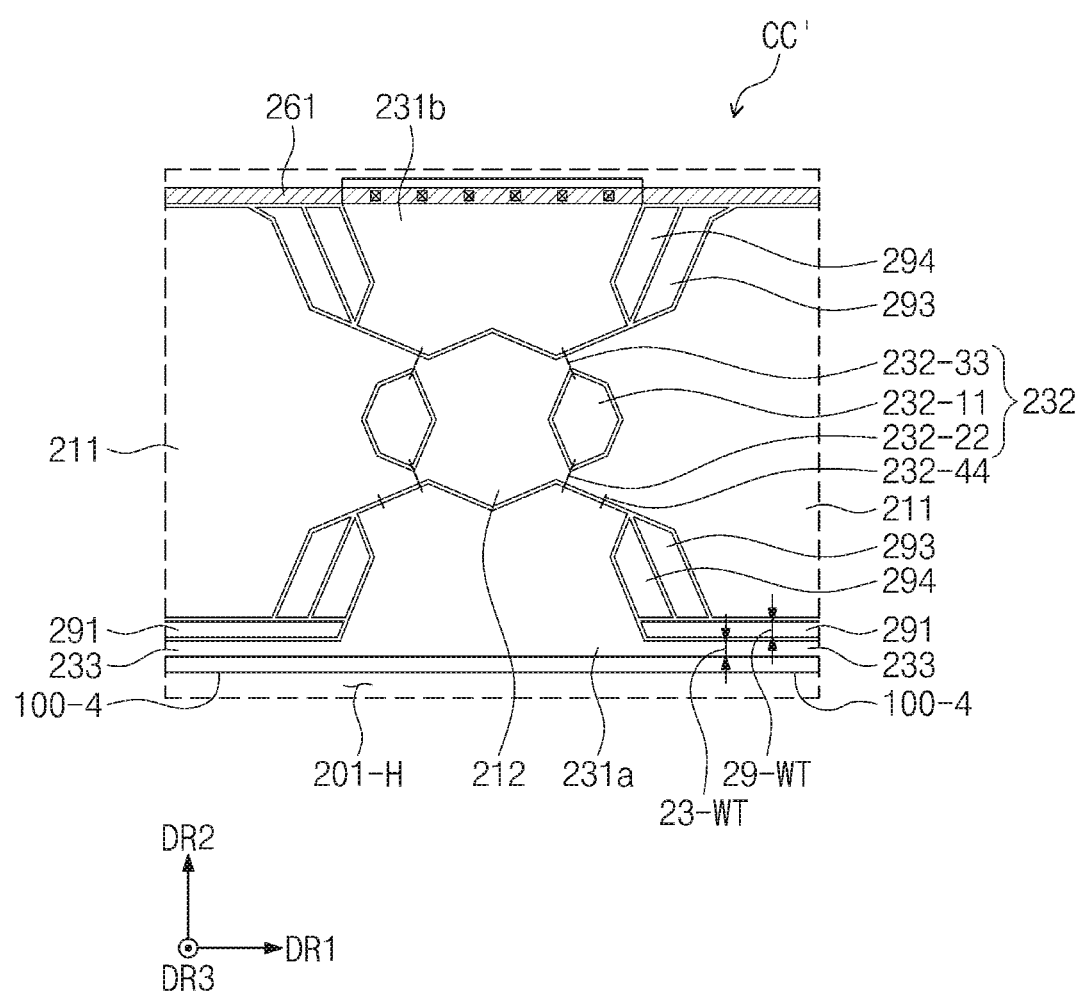
FIG. 7 is an enlarged plan view showing a portion CC' of FIG. 6.
Figure 8:
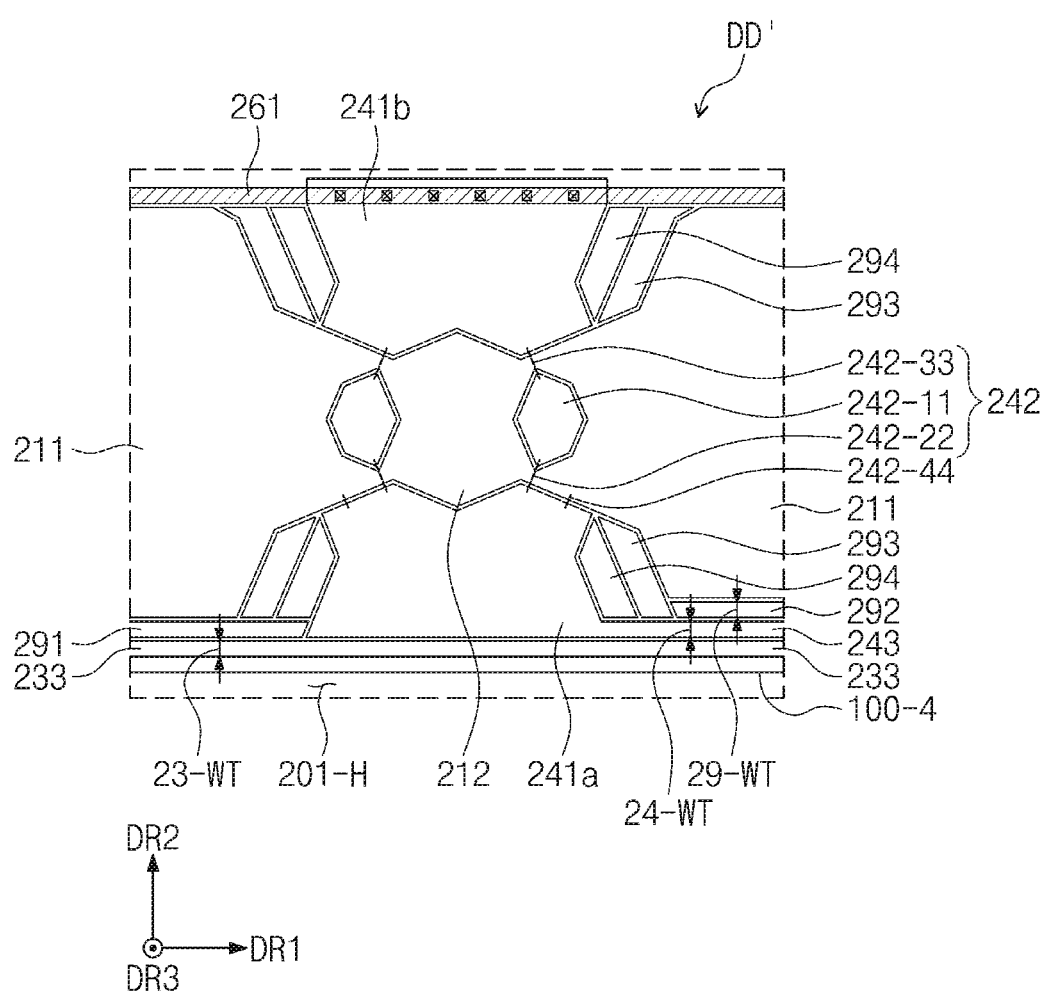
FIG. 8 is an enlarged plan view showing a portion DD' of FIG. 6.

FIG. 7 is an enlarged plan view showing a portion CC' of FIG. 6. FIG. 8 is an enlarged plan view showing a portion DD' of FIG. 6.

FIG. 7 shows the area in which the first connection pattern 212 and the third connection pattern 232 are disposed and a peripheral area thereof. The first connection pattern 212 is disposed on the same layer as the first sensing patterns 211 and includes the same material as the first sensing patterns 211. Additionally or alternatively, the first connection pattern 212 and the first sensing patterns 211 have an integral shape. The first sensing patterns 211 may be referred to as "first portions", and the first connection pattern 212 may be referred to and "second portion".

The first connection pattern 212 and the first sensing patterns 211 include a transparent conductive oxide. For example, the first connection pattern 212 and the first sensing patterns 211 include at least one of indium tin oxide (ITO), indium zinc oxide (IZO), indium gallium oxide (IGO), indium gallium zinc oxide (IGZO), and mixtures/compounds thereof. However, the first connection pattern 212 and the first sensing patterns 211 should not be limited thereto or thereby.

The third connection pattern 232 includes an island pattern 232-11, a first bridge pattern 232-22, and a second bridge pattern 232-33. The island pattern 232-11 is disposed between third sensing patterns 231*a* and 231*b*. The first bridge pattern 232-22 is connected to one third sensing pattern 231*a* and the island pattern 232-11. The second bridge pattern 232-33 is connected to the other third sensing pattern 231*b* and the island pattern 232-11.

The input sensor 200 further includes a bypass pattern 232-44, and the bypass pattern 232-44 is connected to the third sensing pattern 231*a*. The bypass pattern 232-44 is provided in plural, and the bypass patterns 232-44 are connected to the third sensing patterns 231*a* and 231*b*. The bypass patterns 232-44 include the same material as the first bridge pattern 232-22 and the second bridge pattern 232-33. Additionally or alternatively, the bypass patterns 232-44 are disposed on the same layer as the first bridge pattern 232-22 and the second bridge pattern 232-33.

The island pattern 232-11 is disposed on the same layer as the third sensing patterns 231*a* and 231*b* and includes the same material as the third sensing patterns 231*a* and 231*b*. The island pattern 232-11 is surrounded by the first sensing patterns 211 and the first connection pattern 212. The island pattern 231-11 includes a transparent conductive oxide.

The first and second bridge patterns 232-22 and 232-33 are insulated from the first connection pattern 212 while crossing the first connection pattern 212. Each of the first and second bridge patterns 232-22 and 232-33 includes a metal material and has a single-layer or multi-layer structure. For example, each of the first and second bridge patterns 232-22 and 232-33 has the multi-layer structure in which titanium, aluminum, and titanium are sequentially stacked one on another.

The bypass pattern 232-44 has a length shorter than a length of the first bridge pattern 232-22. The bypass pattern 232-44 has a resistance lower than a resistance of the first bridge pattern 232-22. Accordingly, when a static electricity occurs, the static electricity is concentrated at the bypass patterns 232-44 with the lower resistance. As a result, the first and second bridge patterns 232-22 and 232-33 may be prevented from being damaged due to the static electricity.

Different from the exemplary embodiment of the present disclosure, when the connection patterns are regularly arranged, the connection patterns and the bypass patterns may be omitted corresponding to the shape of the hole 201-H. As the bypass patterns are omitted, electrostatic failure risk may increase. According to the exemplary embodiment of the present disclosure, the positions of the connection patterns and the bypass patterns may be adjusted corresponding to the shape of the hole 201-H. As a result, the bypass patterns may be disposed in the peripheral area of the hole 201-H without being omitted. Therefore, the electrostatic failure risk may be prevented from increasing.

The first connection electrode 233 extends from the third sensing pattern 231*a*. The first connection electrode 233 includes the same material as the third sensing pattern 231*a* and is disposed on the same layer as the third sensing pattern 231*a*. The first connection electrode 233 is provided integrally with the third sensing pattern 231*a*.

The first dummy electrodes 291 are disposed between the first connection electrode 233 and the first sensing patterns 211. Each of the first dummy electrodes 291 has a width 29-WT equal to or greater than a width 23-WT of the first connection electrode 233. The first connection electrode 233 may be prevented from coupling to the first sensing patterns 211 by the first dummy electrodes 291.

FIG. 8 shows the area in which the first connection pattern 212 and the fourth connection pattern 242 are disposed and a peripheral area thereof. The fourth connection pattern 242 electrically connects two fourth sensing patterns 241*a* and 241*b* adjacent to each other.

The fourth connection pattern 242 includes an island pattern 242-11, a first bridge pattern 242-22, and a second bridge pattern 242-33. The island pattern 242-11 is disposed between the fourth sensing patterns 241*a* and 241*b*. The first bridge pattern 242-22 is connected to one fourth sensing pattern 241*a* and the island pattern 242-11. The second bridge pattern 242-33 is connected to the other fourth sensing pattern 241b and the island pattern 242-11. A bypass pattern 242-44 has a length shorter than a length of the first bridge pattern 242-22.

The second connection electrode 243 extends from the fourth sensing pattern 241a. The second connection electrode 243 includes the same material as the fourth sensing pattern 241a and is disposed on the same layer as the fourth sensing pattern 241a. The second connection electrode 243 is provided integrally with the fourth sensing pattern 241a.

A second dummy electrode 292 is disposed between the second connection electrode 243 and the first sensing pattern 211. The second dummy electrode 292 has a width 29-WT equal to or greater than a width 24-WT of the second connection electrode 243. The second connection electrode 243 may be prevented from coupling to the first sensing patterns 211 by the second dummy electrodes 292.

A third dummy electrode 293 and a fourth dummy electrode 294 are disposed in an area in which the sensing patterns are not disposed. For example, the third and fourth dummy electrodes 293 and 294 are disposed between the first sensing patterns 211 and the third sensing patterns 231a and 231b and between the first sensing patterns 211 and the fourth sensing patterns 241a and 241b. A difference in reflectance between the area in which the sensing patterns are disposed and the area in which the sensing patterns are not disposed is reduced by the third and fourth dummy electrodes 293 and 294. Accordingly, the sensing patterns are not viewed. Therefore, optical viewing characteristics may be increased.

Figure 9:
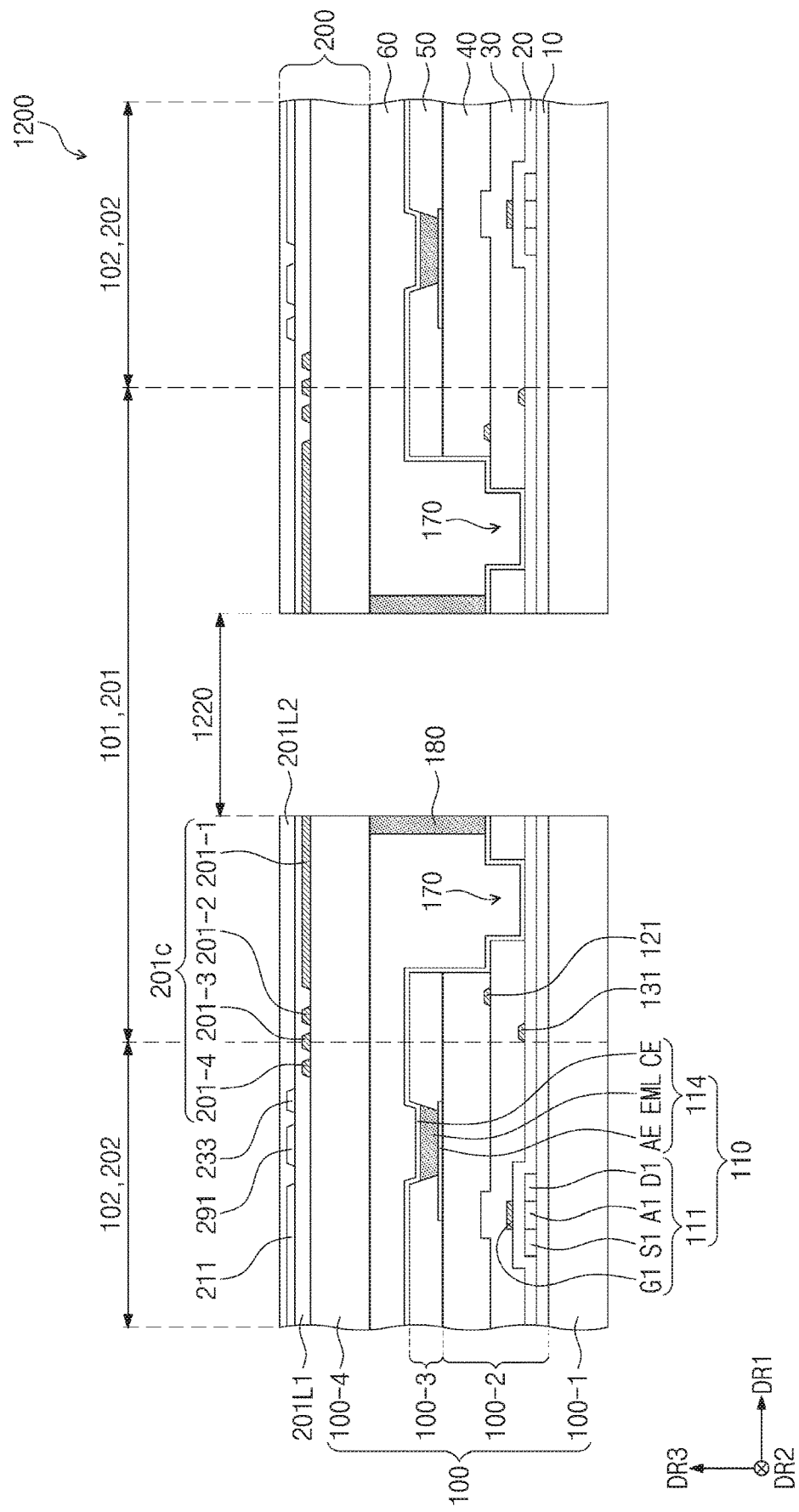
FIG. 9 is a cross-sectional view showing a display module according to an exemplary embodiment of the present disclosure.

FIG. 9 is a cross-sectional view showing a display module 1200 according to an exemplary embodiment of the present disclosure.

Referring to FIG. 9, the display module 1200 includes the display panel 100 and the input sensor 200.

The display panel 100 includes the base substrate 100-1, a circuit layer 100-2, a display element layer 100-3, and a base substrate 100-4. The circuit layer 100-2 is disposed on the base substrate 100-1, the display element layer 100-3 is disposed on the circuit layer 100-2, and the base substrate 100-4 is disposed on the display element layer 100-3.

An auxiliary layer 10 is disposed on the base substrate 100-1 to cover a front surface of the base substrate 100-1. The auxiliary layer 10 includes an inorganic material. The auxiliary layer 10 includes a barrier layer and/or a buffer layer. Accordingly, the auxiliary layer 10 prevents oxygen or moisture introduced through the base substrate 100-1 from entering the pixel 110 or reduces a surface energy of the base substrate 100-1 such that the pixel 110 is stably formed on the base substrate 100-1.

The pixel 110 is disposed on the second area 102. In the present exemplary embodiment, the first thin film transistor 111 and the light-emitting device 114 among the components of the equivalent circuit diagram of the pixel 110 shown in FIG. 3 are shown as a representative example.

The first thin film transistor 111 includes an active A1, a source S1, a drain D1, and a gate G1. The active A1, the source S1, and the drain D1 are provided by one semiconductor pattern.

For example, the semiconductor pattern is disposed on the auxiliary layer 10. The semiconductor pattern includes polysilicon. However, the semiconductor pattern may include amorphous silicon or metal oxide according to embodiments. The semiconductor pattern includes a doped region and a non-doped region. The doped region is doped with an N-type dopant or a P-type dopant. A P-type transistor includes a doped region doped with the P-type dopant. The doped region has a conductivity greater than that of the non-doped region and substantially serves as an electrode or signal line. The non-doped region substantially corresponds to the active (or channel). In other words, a portion of the semiconductor pattern may be the active A1 of the first thin film transistor 111, another portion of the semiconductor pattern may be the source S1 or the drain D1 of the first thin film transistor 111, and the other portion of the semiconductor pattern may be a connection electrode or a connection signal line.

The first insulating layer 20 is disposed on the auxiliary layer 10 to cover the active A1, the source S1, and the drain D1. The first insulating layer 20 is an inorganic layer and/or an organic layer and has a single-layer or multi-layer structure. The first insulating layer 20 may include at least one of aluminum oxide, titanium oxide, silicon oxide, silicon oxynitride, zirconium oxide, and hafnium oxide. In the present exemplary embodiment, the first insulating layer 20 has a single-layer structure of a silicon oxide layer. An insulating layer of the circuit layer 100-2 described later is an inorganic layer and/or an organic layer and has a single-layer or multi-layer structure as well as the first insulating layer 20. The inorganic layer includes at least one of the materials mentioned above.

The gate G1 is disposed on the first insulating layer 20. The gate G1 corresponds to a portion of metal pattern. The gate G1 overlaps the active A1. The gate G1 is used as a mask in the process of doping the semiconductor pattern.

The second signal line 131 is disposed on the first insulating layer 20. Additionally or alternatively, the second signal line 131 is disposed on the first area 101.

The second insulating layer 30 is disposed on the first insulating layer 20 and covers the gate G1 and the second signal line 131. The second insulating layer 30 is an inorganic layer and/or an organic layer and has a single-layer or multi-layer structure. In the present exemplary embodiment, the second insulating layer 30 has a single-layer structure of silicon oxide.

The first signal line 121 is disposed on the second insulating layer 30. Additionally or alternatively, the first signal line 121 is disposed in the first area 101.

The third insulating layer 40 is disposed on the second insulating layer 30 and covers the first signal line 121.

The light-emitting device 114 is disposed on the third insulating layer 40. The light-emitting device 114 includes a first electrode AE, a light-emitting layer EML, and a second electrode CE.

The first electrode AE is electrically connected to the first thin film transistor 111. For example, the first electrode AE is electrically connected to the first thin film transistor 111 via the second thin film transistor 112 (refer to FIG. 3).

The fourth insulating layer 50 is disposed on the third insulating layer 40. The fourth insulating layer 50 includes an organic material and/or an inorganic material and has a single-layer or multi-layer structure. An opening is defined through the fourth insulating layer 50, and at least a portion of the first electrode AE is exposed through the opening. The fourth insulating layer 50 may be referred to as a "pixel definition layer".

The light-emitting layer EML is disposed on the first electrode AE exposed through the opening. The light-emitting layer EML includes a light-emitting material. The light-emitting layer EML may include at least one material among materials respectively emitting red, green, and blue lights. The light-emitting layer EML includes a fluorescent material or a phosphorescent material. The light-emitting layer EML includes an organic light-emitting material or an inorganic light-emitting material. The light-emitting layer EML emits the light in response to a difference in electric potential between the first electrode AE and a second electrode CE.

The second electrode CE is disposed on the light-emitting layer EML. The second electrode CE faces the first electrode AE. The second electrode CE is commonly disposed in the pixels 110. Each of the pixels 110 receives a common voltage (hereinafter, referred to as a "second power voltage") through the second electrode CE.

A recessed portion 170 is defined in the first area 101. The recessed portion 170 is provided to surround an edge of the hole 1220. The recessed portion 170 blocks a path in which moisture or oxygen introduced through the hole 1220 enters the pixel 110. The recessed portion 170 is defined by removing some portions of the components forming the display panel 100. For example, some portions of the second, third, and fourth insulating layers 30, 40, and 50 are removed to provide the recessed portion 170. However, this is merely exemplary. According to an exemplary embodiment of the present disclosure, the recessed portion 170 may not be provided.

The base substrate 100-4 is disposed on the second electrode CE. The base substrate 100-4 is spaced apart from the second electrode CE. A space 60 between the base substrate 100-4 and the second electrode CE is filled with air or inert gas. Additionally or alternatively, in the exemplary embodiment of the present disclosure, the space 60 may be filled with a filler, such as a silicon-based polymer, an epoxy-based resin, or an acrylic-based resin.

The base substrate 100-4 is coupled to the base substrate 100-1 by a sealing member 180. The sealing member 180 defines an inner surface of the hole 1220. The sealing member 180 includes an organic material, such as a light-curable resin or a light plastic resin, or an inorganic material such as a frit seal. However, the sealing member 180 should not be limited to a particular embodiment.

The input sensor 200 includes the base substrate 100-4, a plurality of conductive layers, and a plurality of insulating layers 201L1 and 201L2. In the exemplary embodiment of the present disclosure, the base substrate 100-4 is included in all the input sensor 200 and the display panel 100. For example, the base substrate 100-4 may be an encapsulation substrate of the display panel 100 and may be a base substrate on which the components of the input sensor 200 are formed. In the exemplary embodiment of the present disclosure, the base substrate of the input sensor 200 may be provided as a separate component from the base substrate 100-4 of the display panel 100. In this case, an adhesive layer may be additionally disposed between the base substrate of the input sensor 200 and the base substrate 100-4 of the display panel 100.

In the exemplary embodiment of the present disclosure, the conductive layer of the input sensor 200 may be disposed on an encapsulation layer instead of the base substrate 100-4. For example, the base substrate 100-4 may be omitted, and the encapsulation layer may be disposed on the display element layer 100-3 and may encapsulate the display element layer 100-3. The encapsulation layer may include an inorganic layer, an organic layer, and an inorganic layer, which are sequentially stacked. The conductive layer of the input sensor 200 may be disposed directly on the encapsulation layer to make contact with the encapsulation layer. Additionally or alternatively, according to another exemplary embodiment, a planarization layer may be additionally disposed on the encapsulation layer to planarize the encapsulation layer. In this case, the conductive layer of the input sensor 200 may be disposed directly on the planarization layer to make contact with the planarization layer.

In the exemplary embodiment of the present disclosure, the input sensor 200 further includes a cover portion 201c. For example, the cover portion 201c is disposed in the first area 201. A laser etching process is used to form the hole 1220 through the display module 1200. The cover portion 201c is disposed adjacent to the area in which the hole 1220 is formed to protect components disposed under the cover portion 201c. For example, the cover portion 201c prevents the first signal line 121 and the second signal line 131 from being damaged by a laser beam.

In the exemplary embodiment of the present disclosure, the cover portion 201c is electrically connected to the ground line 271 (refer to FIG. 5) through at least one dummy electrode or at least one connection line. In this case, electric charges generated during the process are discharged through the ground line 271 (refer to FIG. 5) without being accumulated on the cover portion 201c. Accordingly, the destruction of a peripheral element caused when the accumulated electric charges are discharged, for example, the first sensing pattern 211, may be prevented.

The cover portion 201c includes a first cover pattern 201-1, a second cover pattern 201-2, a third cover pattern 201-3, and a fourth cover pattern 201-4. However, this is merely exemplary. The number of the cover patterns included in the cover portion 201c may be changed.

The cover portion 201c forms the first conductive layer. The first conductive layer further includes the first and second bridge patterns 232-22 and 232-33 (refer to FIG. 7), the first sensing lines 250 (refer to FIG. 5), the second sensing lines 261 and 262 (refer to FIG. 5), the ground lines 271 and 272 (refer to FIG. 5).

The first conductive layer includes a metal material and has a single-layer or multi-layer structure. For example, the first conductive layer has the multi-layer structure in which titanium, aluminum, and titanium are sequentially stacked one on another. However, this is merely exemplary. The material for the first conductive layer should not be limited thereto or thereby.

The first insulating layer 201L1 covers the first conductive layer. The first insulating layer 201L1 includes an organic material and/or an inorganic material and has a single-layer or multi-layer structure. In the exemplary embodiment of the present disclosure, the first insulating layer 201L1 has the single-layer structure of silicon oxide.

The second conductive layer is disposed on the first insulating layer 201L1. The second conductive layer includes first, second, third, and fourth sensing patterns 211, 221, 231, and 241 (refer to FIG. 5), the first and second connection patterns 212 and 222 (refer to FIG. 5), the island pattern 232-11 (refer to FIG. 7), the dummy electrodes 291, 292, 293, and 294 (refer to FIGS. 7 and 8), the first connection electrode 233 (refer to FIG. 8), and the second connection electrode 243 (refer to FIG. 8).

The second conductive layer includes a transparent conductive oxide. For example, the second conductive layer includes at least one of indium tin oxide (ITO), indium zinc oxide (IZO), indium gallium oxide (IGO), indium gallium zinc oxide (IGZO), and mixtures/compounds thereof. However, the second conductive layer should not be limited thereto or thereby.

The second insulating layer 201L2 covers the second conductive layer. The second insulating layer 201L2 includes an organic material and/or an inorganic material and has a single-layer or multi-layer structure. In the exemplary embodiment of the present disclosure, the second insulating layer 201L2 has the single-layer structure of silicon oxide.

Figure 10:
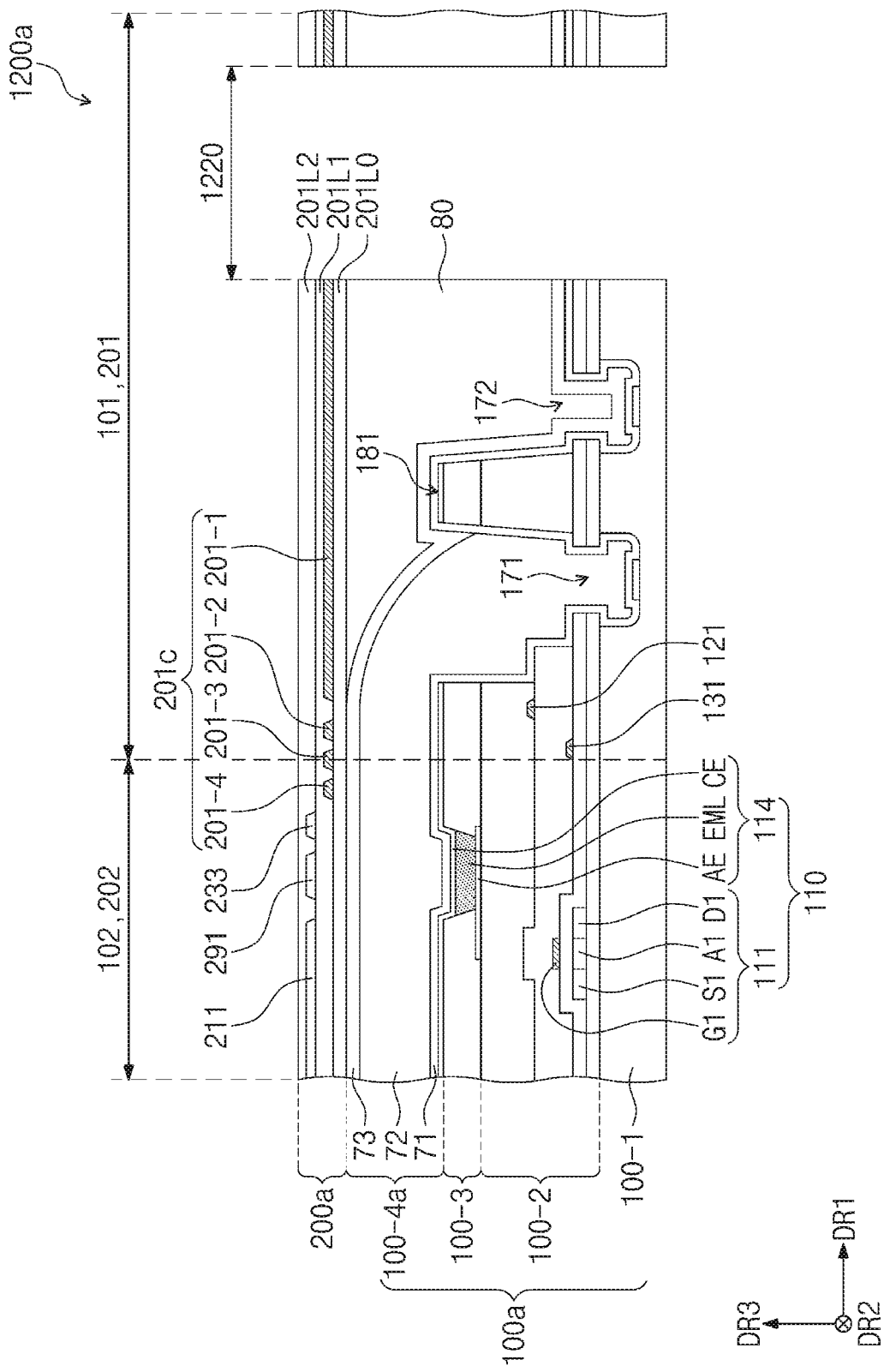
FIG. 10 is a cross-sectional view showing a display module according to an exemplary embodiment of the present disclosure.

FIG. 10 is a cross-sectional view showing a display module 1200a according to an exemplary embodiment of the present disclosure.

Referring to FIG. 10, the display module 1200a includes a display panel 100a and an input sensor 200a.

The display panel 100a includes a base substrate 100-1, a circuit layer 100-2, a display element layer 100-3, and an encapsulation layer 100-4a. The circuit layer 100-2 is disposed on the base substrate 100-1, the display element layer 100-3 is disposed on the circuit layer 100-2, and the encapsulation layer 100-4a is disposed on the display element layer 100-3.

Recessed portions 171 and 172 are defined in the first area 101. Each of the recessed portions 171 and 172 is defined to surround an edge of a module hole 1220. The recessed portions 171 and 172 block a path through which moisture or oxygen introduced through the module hole 1220 enters into the pixel 110. The recessed portions 171 and 172 are defined by removing some of components forming the display panel 100a. FIG. 10 shows two recessed portions 171 and 172 as a representative example. However, the number of the recessed portions 171 and 172 should not be limited thereto or thereby.

A dam portion 181 is disposed between the recessed portions 171 and 172. FIG. 10 shows one dam portion 181 as a representative example. However, the number of the dam portions 181 should not be limited to one. The dam portion 181 has a stacked structure of predetermined insulating layers. However, the number of the insulating layers forming the dam portion 181 may be changed in various ways. The dam portion 181 prevents an organic layer 72 described below from expanding.

The encapsulation layer 100-4a is disposed on the display element layer 100-3 and encapsulates the light-emitting device 114. Meanwhile, although not shown in figures, a capping layer is further disposed between the second electrode CE and the encapsulation layer 100-4a to cover the second electrode CE.

The encapsulation layer 100-4a includes a first inorganic layer 71, an organic layer 72, and a second inorganic layer 73, which are sequentially stacked in the third direction DR3. However, the encapsulation layer 100-4a should not be limited thereto or thereby. The encapsulation layer may further include a plurality of inorganic layers and a plurality of organic layers.

The first inorganic layer 71 covers the second electrode CE. The first inorganic layer 71 prevents external moisture or oxygen from entering the light-emitting device 114. For example, the first inorganic layer 71 includes silicon nitride, silicon oxide, or a combination thereof. The first inorganic layer 71 is formed by a chemical vapor deposition process.

The organic layer 72 is disposed on the first inorganic layer 71 and contacts the first inorganic layer 71. The organic layer 72 provides a flat surface on the first inorganic layer 71. An uneven shape formed on the upper surface of the first inorganic layer 71 or particles located on the first inorganic layer 71 is covered by the organic layer 72. Therefore, influence of a surface state of the upper surface of the first inorganic layer 71, which is exerted on components formed on the organic layer 72, is blocked. Additionally or alternatively, the organic layer 72 relieves stress between layers contacting each other. The organic layer 72 includes an organic material and is formed by a solution process, such as a spin coating, a slit coating, or an inkjet process.

The second inorganic layer 73 is disposed on the organic layer 72 to cover the organic layer 72. The second inorganic layer 73 is stably formed on a relatively flat surface than being disposed on the first inorganic layer 71. The second inorganic layer 73 encapsulates moisture leaked from the organic layer 72 to prevent the moisture from flowing to the outside. The second inorganic layer 73 includes silicon nitride, silicon oxide, or a compound thereof. A chemical vapor deposition process forms the second inorganic layer 73.

The cover portion 80 is disposed in the first area 101. The cover portion 80 covers an uneven surface caused by the dam portion 181 or the recessed portions 171 and 172 and defines an even surface.

The input sensor 200a includes a plurality of insulating layers 201L0, 201L1, and 201L2 and a plurality of conductive layers. The insulating layers 201L0, 201L1, and 201L2 include a base insulating layer 201L0, a first insulating layer 201L1, and a second insulating layer 201L2.

The base insulating layer 201L0 is an inorganic layer containing one of silicon nitride, silicon oxynitride, and silicon oxide. Additionally or alternatively, the base insulating layer 201L0 is an organic layer containing an epoxy resin, an acryl resin, or an imide-based resin. The base insulating layer 201L0 is formed directly on the display panel 100a. The base insulating layer 201L0 has a single-layer or multi-layer structure.

The first conductive layer is disposed on the base insulating layer 201L0. The first conductive layer includes the first and second bridge patterns 232-22 and 232-33 (refer to FIG. 7), the first sensing lines 250 (refer FIG. 5), the second sensing lines 261 and 262 (refer to FIG. 5), and the ground lines 271 and 272 (refer to FIG. 5).

The first insulating layer 201L1 covers the first conductive layer. The first insulating layer 201L1 includes an organic material and/or an inorganic material and has a single-layer or multi-layer structure.

The second conductive layer is disposed on the first insulating layer 201L1. The second conductive layer includes the first, second, third, and fourth sensing patterns 211, 221, 231, and 241 (refer to FIG. 5), the first and second connection patterns 212 and 222 (refer to FIG. 5), the island pattern 232-11 (refer to FIGS. 7 and 8), the dummy electrodes 291, 292, 293, and 294 (refer to FIG. 8), the first connection electrode 233 (refer to FIG. 6), and the second connection electrode 243 (refer to FIG. 6).

The second insulating layer 201L2 covers the second conductive layer. The second insulating layer 201L2 includes an organic material and/or an inorganic material and has a single-layer or multi-layer structure.

Figure 11:
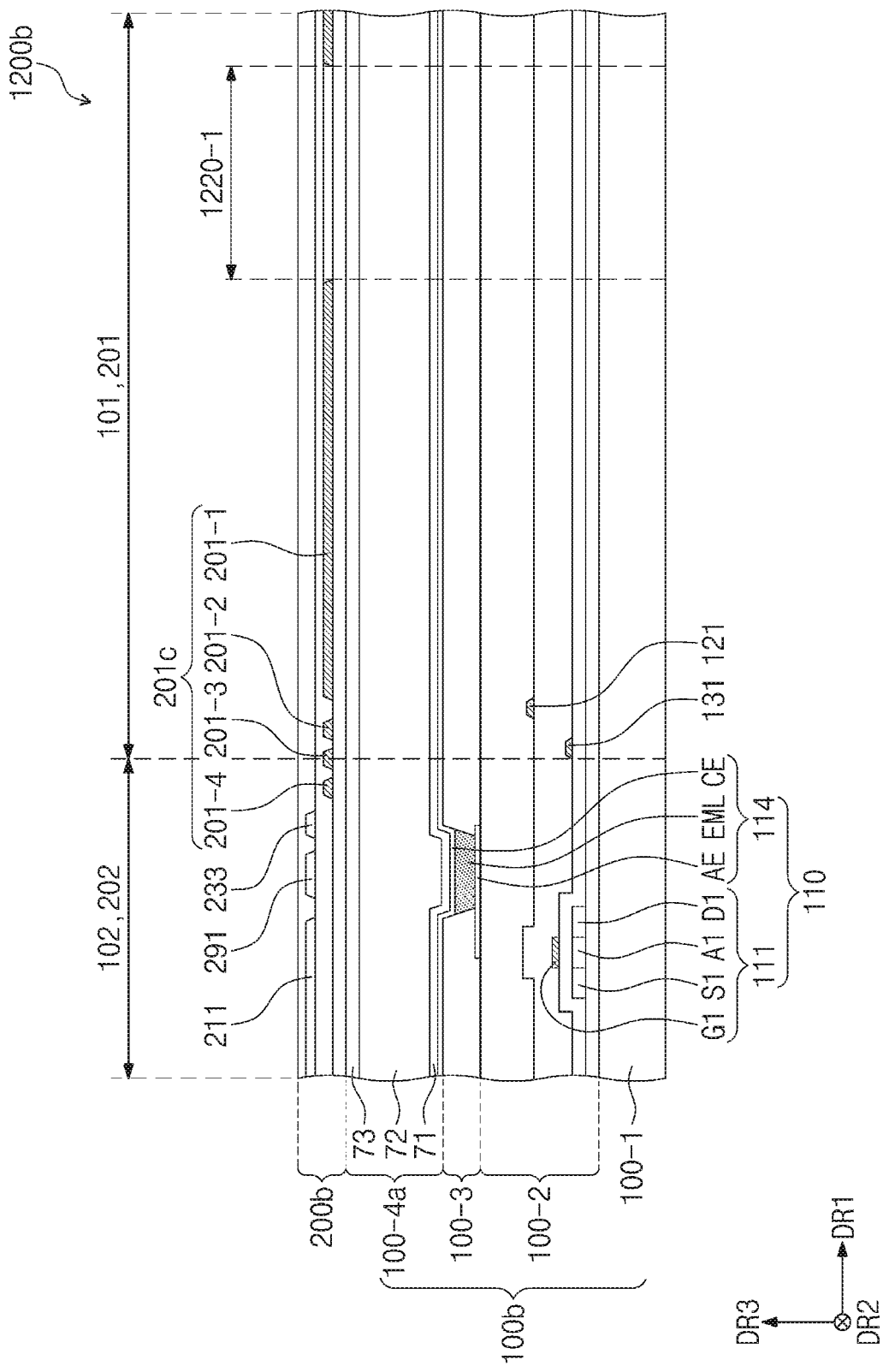
FIG. 11 is a cross-sectional view showing a display module according to an exemplary embodiment of the present disclosure.

FIG. 11 is a cross-sectional view showing a display module 1200b according to an exemplary embodiment of the present disclosure.

Referring to FIG. 11, the display module 1200b includes a display panel 100b and an input sensor 200b. As compared with FIG. 10, the hole 1220 (refer to FIG. 10) is not defined in the display panel 100b and the input sensor 200b. Additionally or alternatively, a transmissive area 1220-1 is defined in the display panel 100b and the input sensor 200b.

The transmissive area 1220-1 has a relatively higher transmittance than the second area 102 (refer to FIG. 3). The transmissive area 1220-1 is a space through which external signals input to the electronic modules 1300 (refer to FIG. 2) or signals output from the electronic modules 1300 (refer to FIG. 2) are transmitted.

In the present exemplary embodiment, a second electrode CE is formed to overlap the transmissive area 1220-1. When the second electrode CE is a transmissive or transflective electrode, the transmissive area 1220-1 has a relatively higher transmittance than the area in which the pixel 110 is disposed even though the second electrode CE overlaps the transmissive area 1220-1.

The transmissive area 1220-1 has a shape corresponding to the hole 1220 in a plane. For example, the transmissive area 1220-1 has one of a circular shape, an oval shape, a polygonal shape, and a polygonal shape with a curved side on at least one side thereof in the plan view. However, the transmissive area 1220-1 should not be particularly limited to the exemplary shapes.

Although the exemplary embodiments of the present disclosure have been described, it is understood that the present disclosure should not be limited to these exemplary embodiments, but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. An electronic apparatus comprising:
   a display panel; and
   an input sensor disposed on the display panel, comprising unit sensor areas arranged in a first direction and a second direction, and comprising sensing patterns and connection patterns electrically connecting the sensing patterns,
   wherein a hole is defined through the display panel and the input sensor,
   wherein the unit sensor areas comprise a first unit sensor area overlapping the hole and a second unit sensor area not overlapping the hole,
   wherein a first connection pattern disposed in the first unit sensor area among the connection patterns does not overlap the hole and is disposed in an area of the first unit sensor area spaced apart from a first center of the first unit sensor area, and
   wherein a second connection pattern disposed in the second unit sensor area among the connection patterns is disposed at a second center of the second unit sensor area.

2. The electronic apparatus of claim 1, wherein a width in the first direction of the hole is greater than a width in the second direction of the hole.

3. The electronic apparatus of claim 1, wherein the input sensor further comprises a first connection electrode surrounding the hole entirely, wherein the sensing patterns comprise a first sensing pattern and a second sensing pattern spaced apart from the first sensing pattern in the second direction such that the hole is disposed between the first and second sensing patterns, and the first sensing pattern and the second sensing pattern are electrically connected to each other by the first connection electrode.

4. The electronic apparatus of claim 3, wherein the input sensor further comprises a second connection electrode surrounding a portion of the hole and spaced apart from the hole such that the first connection electrode is disposed between the hole and the second connection electrode, wherein the sensing patterns further comprise a third sensing pattern and a fourth sensing pattern spaced apart from the third sensing pattern in the second direction such that the hole is disposed between the third sensing pattern and the fourth sensing pattern, and the third sensing pattern and the fourth sensing pattern are electrically connected to each other by the second connection electrode.

5. The electronic apparatus of claim 4, wherein the input sensor further comprises:
   a first dummy electrode disposed adjacent to the first connection electrode; and
   a second dummy electrode disposed adjacent to the second connection electrode, wherein the first dummy electrode has a width equal to or greater than a width of the first connection electrode, and the second dummy electrode has a width equal to or greater than a width of the second connection electrode.

6. The electronic apparatus of claim 1, wherein the unit sensor areas further comprise a third unit sensor area overlapping the hole, the first center of the first unit sensor area overlaps the hole, a third center of the third unit sensor area does not overlap the hole, and a third connection pattern disposed in the third unit sensor area among the connection patterns is disposed at the third center of the third unit sensor area.

7. The electronic apparatus of claim 1, wherein the input sensor further comprises a bypass pattern connected to one second sensing pattern of two second sensing patterns arranged in the second direction among the sensing patterns, wherein each of the connection patterns comprises a connection pattern connecting two first sensing patterns arranged in the first direction, an island pattern disposed between the two second sensing patterns and spaced apart from the connection pattern, a first bridge pattern connected to the island pattern and one of the two second sensing patterns, and a second bridge pattern connected to the island pattern and another of the two second sensing patterns, and the bypass pattern has a length shorter than a length of the first bridge pattern.

8. An electronic apparatus comprising:
   a display panel; and
   an input sensor disposed on the display panel, comprising unit sensor areas arranged in a first direction and a second direction, and comprising sensing patterns, connection patterns electrically connecting the sensing patterns, and a first connection electrode,
   wherein a hole is defined through the display panel and the input sensor, and
   wherein the first connection electrode surrounding the hole, wherein the sensing patterns comprise a first sensing pattern and a second sensing pattern spaced apart from the first sensing pattern in the second direction such that the hole is disposed between the first and second sensing patterns, and the first sensing pattern and the second sensing pattern are electrically connected to each other by the first connection electrode.

9. The electronic apparatus of claim 8, wherein the input sensor further comprises a second connection electrode surrounding a portion of the hole and spaced apart from the hole such that the first connection electrode is disposed between the hole and the second connection electrode, wherein the sensing patterns further comprise a third sensing pattern and a fourth sensing pattern spaced apart from the third sensing pattern in the second direction such that the hole is disposed between the third sensing pattern and the fourth sensing pattern, and the third sensing pattern and the fourth sensing pattern are electrically connected to each other by the second connection electrode.

10. The electronic apparatus of claim 9, wherein the input sensor further comprises:
   a first dummy electrode disposed adjacent to the first connection electrode; and
   a second dummy electrode disposed adjacent to the second connection electrode, wherein the first dummy electrode has a width equal to or greater than a width of the first connection electrode, and the second dummy electrode has a width equal to or greater than a width of the second connection electrode.

11. The electronic apparatus of claim 8, wherein the unit sensor areas comprise a first unit sensor area overlapping the hole and a second unit sensor area not overlapping the hole,
   wherein a first connection pattern disposed in the first unit sensor area among the connection patterns does not overlap the hole and is disposed in an area of the first unit sensor area spaced apart from a first center of the first unit sensor area, and
   wherein a second connection pattern disposed in the second unit sensor area among the connection patterns is disposed at a second center of the second unit sensor area.

12. The electronic apparatus of claim 8, wherein a width in the first direction of the hole is greater than a width in the second direction of the hole.

13. An electronic apparatus comprising:
   a display panel; and
   an input sensor disposed on the display panel, comprising unit sensor areas arranged in a first direction and a second direction, and comprising sensing patterns and connection patterns electrically connecting the sensing patterns,
   wherein a hole is defined through the display panel and the input sensor,
   wherein the unit sensor areas comprise a first unit sensor area overlapping the hole and a second unit sensor area overlapping the hole,
   wherein a first connection pattern disposed in the first unit sensor area among the connection patterns does not overlap the hole and is disposed in an area of the first unit sensor area spaced apart from a first center of the first unit sensor area,
   wherein a second connection pattern disposed in the second unit sensor area among the connection patterns is disposed at a second center of the second unit sensor area, and
   wherein the first center of the first unit sensor area overlaps the hole, the second center of the second unit sensor area does not overlap the hole.

* * * * *